(12) United States Patent
Norton et al.

(10) Patent No.: US 8,584,421 B2
(45) Date of Patent: Nov. 19, 2013

(54) PANEL MOUNTING COMPONENTS, SYSTEMS, AND METHODS

(75) Inventors: A. Chase Norton, Salt Lake City, UT (US); Bryan K. Harris, Sandy, UT (US)

(73) Assignee: 3form, Inc., Salt Lake City, UT (US)

( * ) Notice: Subject to any disclaimer, the term of this patent is extended or adjusted under 35 U.S.C. 154(b) by 160 days.

(21) Appl. No.: 13/129,239

(22) PCT Filed: Nov. 12, 2009

(86) PCT No.: PCT/US2009/064107
§ 371 (c)(1),
(2), (4) Date: May 13, 2011

(87) PCT Pub. No.: WO2010/056791
PCT Pub. Date: May 20, 2010

(65) Prior Publication Data
US 2011/0214379 A1 Sep. 8, 2011

Related U.S. Application Data

(60) Provisional application No. 61/114,521, filed on Nov. 14, 2008, provisional application No. 61/155,310, filed on Feb. 25, 2009.

(51) Int. Cl.
*E04B 1/38* (2006.01)
*E04C 1/40* (2006.01)

(52) U.S. Cl.
USPC ............ 52/511; 52/704; 248/205.1; 248/530; 24/458; 411/82; 411/107

(58) Field of Classification Search
USPC ............ 52/204.7, 704, 235, 786.1, 511, 699; 411/511, 516, 509, 82, 107, 508, 506, 411/171; 228/113, 112.1, 114.5, 2.3; 29/525, 456; 248/205.1, 205.3, 200, 248/507, 156, 530; 24/457, 458
See application file for complete search history.

(56) References Cited

U.S. PATENT DOCUMENTS

| | | | |
|---|---|---|---|
| 1,008,029 A | 11/1911 | Gorman | |
| 2,204,392 A | 6/1940 | Arm | |
| 3,037,542 A * | 6/1962 | Boyd | ............................. 411/105 |
| 3,269,251 A * | 8/1966 | Bass | ................................ 411/21 |

(Continued)

FOREIGN PATENT DOCUMENTS

WO 2010056791 A1 5/2010

OTHER PUBLICATIONS

USPTO, Written Opinion of the International Searching Authority in PCT/US2009/064107, Dec. 30, 2009 (5 pages).

(Continued)

*Primary Examiner* — Chi Q Nguyen
(74) *Attorney, Agent, or Firm* — Workman Nydegger

(57) ABSTRACT

Panel mounting components and systems for mounting objects, such as decorative architectural resin panels, can include one or more of a twist-lock mounting assembly and a melt-bondable panel mounting bracket. Twist-lock mounting assemblies can include a housing and locking pin configured to automatically lock together, thereby allowing a user to quickly and easily mount and dismount panels from a support structure. Melt-bondable panel mounting brackets can include one or more bonding features configured to be pressed into a resin-based panel, thereby allowing additional components, such as a twist-lock mounting assembly, to be secured directly to a single side of a panel.

8 Claims, 10 Drawing Sheets

(56) References Cited

U.S. PATENT DOCUMENTS

| | | | |
|---|---|---|---|
| 3,491,183 A | | 1/1970 | Brow |
| 3,679,789 A | | 7/1972 | Wheadon et al. |
| 3,784,435 A | | 1/1974 | Bagheri et al. |
| 4,058,421 A | | 11/1977 | Summo |
| 4,203,189 A | | 5/1980 | Rawson |
| 4,214,406 A | * | 7/1980 | Wittmann et al. .................. 52/1 |
| 4,225,379 A | | 9/1980 | Ishii et al. |
| 4,312,165 A | * | 1/1982 | Mizusawa ........................ 52/511 |
| 4,642,964 A | * | 2/1987 | Kellison .......................... 52/699 |
| 4,717,301 A | * | 1/1988 | Oddenino ..................... 411/373 |
| 4,793,112 A | | 12/1988 | Sufke |
| 4,875,271 A | | 10/1989 | Coller et al. |
| 5,069,014 A | * | 12/1991 | Kubbutat ....................... 52/235 |
| 5,116,004 A | | 5/1992 | Luecke |
| 5,324,146 A | * | 6/1994 | Parenti et al. ................... 411/82 |
| 6,519,903 B1 | * | 2/2003 | Dirisamer et al. .............. 52/235 |
| 6,632,056 B1 | * | 10/2003 | Lind .............................. 411/107 |
| 6,735,921 B2 | * | 5/2004 | Oberhofer et al. ........... 52/786.1 |
| 7,225,521 B2 | | 6/2007 | Krause et al. |
| 7,686,552 B2 | * | 3/2010 | Bohnet et al. .................. 411/82 |
| 2006/0213954 A1 | | 9/2006 | Ruther et al. |
| 2010/0320340 A1 | | 12/2010 | Hillstrom et al. |

OTHER PUBLICATIONS

USPTO, Search Report of the International Searching Authority in PCT/US2009/064107, Dec. 30, 2009 (3 pages).

* cited by examiner

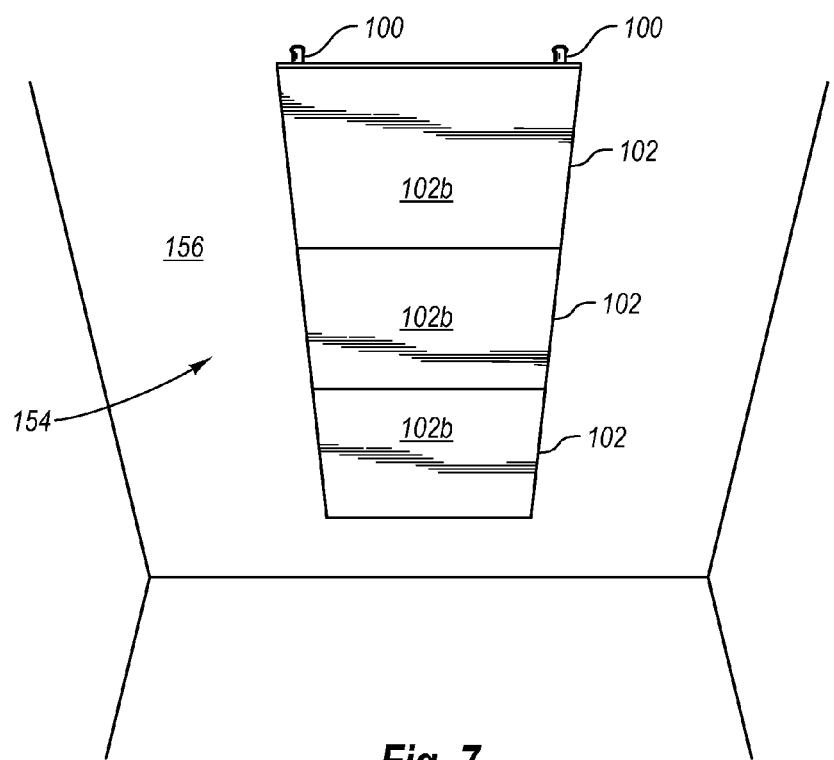
*Fig. 7*
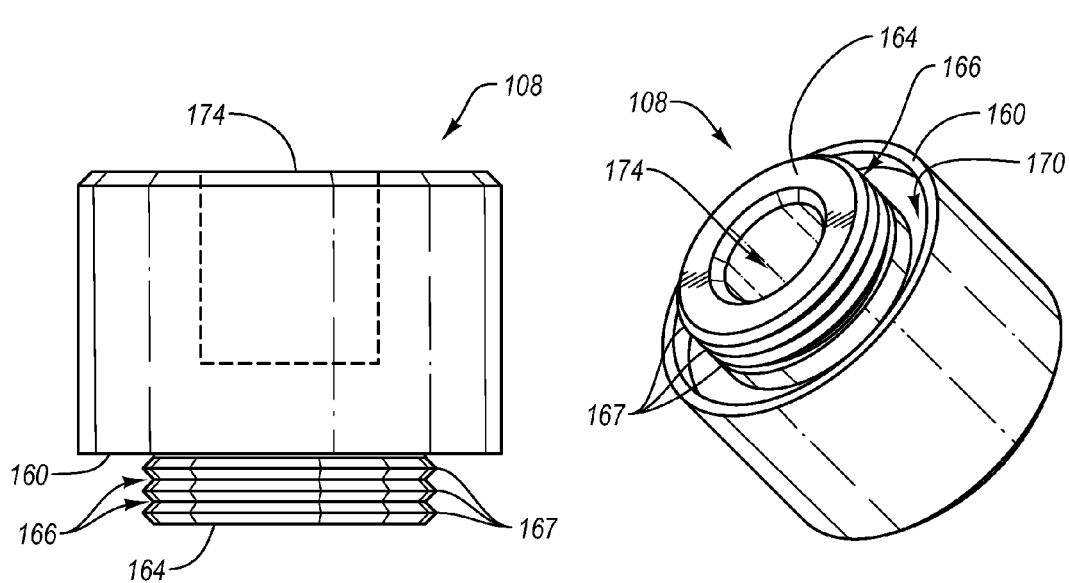
*Fig. 8*  *Fig. 9*

PANEL MOUNTING COMPONENTS, SYSTEMS, AND METHODS

CROSS-REFERENCE TO RELATED APPLICATIONS

This application is a U.S. National Stage Application of PCT Application No. PCT/US09/64107, filed on Nov. 12, 2009, entitled "Panel Mounting Components, Systems, and Methods" which claims the benefit of priority to U.S. Provisional Application No. 61/114,521, filed Nov. 14, 2008, entitled "Melt-Bondable Panel Mounting Brackets and Methods," and U.S. Provisional Application No. 61/155,310, filed Feb. 25, 2009, entitled "Click-lock Panel Mounting Apparatus, Systems, and Methods." The entire contents of above-referenced applications are incorporated by reference herein.

BACKGROUND OF THE INVENTION

1. The Field of the Invention

The present invention relates to systems, methods, and apparatus for mounting and/or displaying panels as partitions, displays, barriers, treatments, or other structure.

2. Background and Relevant Art

Recent trends in building design involve adding to or changing the functional and/or aesthetic characteristics of a given structure or design space by mounting one or more decorative panels thereto. This is at least partly since there is sometimes more flexibility with how the panel (or set of panels) is designed, compared with the original structure. Panels formed from resin materials are particularly popular because they tend to be less expensive, in most applications, than materials such as glass or the like, where certain structural, optical, and aesthetic characteristics are desired. In addition, resin materials tend to be more flexible in terms of manufacture and assembly because they can be relatively easily bent, molded, colored, shaped, cut, and otherwise modified in a variety of different ways. Decorative resins can also provide more flexibility compared with glass and other conventional materials at least in terms of color, degree of texture, gauge, and impact resistance. Additionally, decorative resins have a fairly wide utility since they may be formed to include a large variety of colors, images, interlayers, and shapes.

Unfortunately, conventional hardware used to mount such panels tends to suffer from a number of drawbacks. For example, mounting panels to a wall or other support structure using such conventional hardware can be difficult and labor intensive. For example, one conventional type of mounting system used to secure panels to a support structure (e.g., wall, ceiling, or frame) uses one or more standoffs. In general, a standoff positions a panel at a "standoff" (or extended) position with respect to the support structure. In particular, after mounting a standoff to a support structure, an assembler is typically required to hold the panel in a desired mounting position, attempt to align a perforation in the panel with the standoff, align and thread a screw through the perforation in the panel, and secure the screw to the standoff.

One will appreciate that this and similar mounting processes can be difficult and cumbersome, particularly when using large or heavy panels. Indeed, due to the awkwardness that may be caused by conventional mounting hardware, installers can easily drop or otherwise damage panels during installation. Additionally, because conventional panel mounting systems require complicated hardware and installation processes they typically do not allow panels to be easily or quickly assembled and disassembled. This can be problematic since a user may need to regularly remove panels to access the space beyond the panels for the changing of lighting bulbs, HVAC maintenance, etc.

Furthermore, when mounting panels to support structures using conventional standoffs, individual standoffs are often secured to the corners or edges of the panel one at a time. One will appreciate that this means a panel may be supported by only one or two standoffs during the installation process. This unbalanced support can cause increased concentration of stresses in the panel around these standoffs, which often leads to cracks and other panel damage. Additionally, when only one or two standoffs are secured to a panel it is easy for an installer to inadvertently bend the panel about such standoffs in an attempt to align further standoffs, which can cause panel damage.

The mounting of decorative panels using conventional hardware typically requires tools that may lead to panel damage. For example, conventional panel mounting hardware, such as standoffs, typically requires the use of a wrench or screw driver in close proximately to a panel for assembly. Wrenches and other large tools are often cumbersome to use and may lead to inadvertent panel damage. For instance, assemblers often scratch or otherwise damage panels during tightening of the hardware.

In addition to the foregoing, conventional mounting hardware is often unsightly, too noticeable, or does not provide an appropriate aesthetic for desired design environments. The unpleasant aesthetic of conventional mounting hardware is often magnified when used with translucent, transparent, or other panels that magnify texture, light, color, and form. For example, the caps of conventional standoffs often cover at least a portion of the display surface of the panel and may otherwise detract from the aesthetics provided by the panel. Thus, conventional mounting hardware may be unappealing to designers and architects seeking to obtain a certain aesthetic by using decorative architectural panels.

In particular, this undesired aesthetic is often a result of mounting hardware, such as a conventional standoff cap, protruding from the panel surface. In addition to providing an undesirable aesthetic, protruding standoff caps can also present various functional drawbacks. For instance, conventional, protruding standoffs typically do not allow for a panel to be mounted as a wall, countertop, or step with a substantially smooth or flush surface. Furthermore, a protruding standoff cap may reduce the usable surface area of the panel, and create a protruding structure upon which objects (such as loosing clothing etc.) can easily catch or hook.

Accordingly, there are a number of disadvantages in conventional panel mounting systems and hardware that can be addressed.

BRIEF SUMMARY OF THE INVENTION

Implementations of the present invention solve one or more of the foregoing problems in the art with systems, methods, and apparatus for mounting panels as partitions, displays, barriers, treatments, or other structure with increased functional versatility. In particular, various components, systems, and methods described herein allow panels to be quickly and efficiently assembled and disassembled with relative ease. For example, one or implementations of the present invention can include a twist-lock mounting assembly configured to releasably secure a decorative architectural panel to a support structure. One or more other implementations can include a melt-bondable panel mounting bracket for mounting an object, such as a decorative architectural resin-based, to a support structure. Such can provide a secure and reliable way to mount panels that also significantly reduces the time and labor needed to mount and/or dismount panels to a structure.

For example, an implementation of a twist-lock mounting assembly can include a locking pin. The locking pin can include a shaft having one or more flanges extending therefrom. Additionally, the locking pin can be configured to be secured to one of a panel and a support structure. The twist-lock mounting assembly can also include a housing having one or more engagement features and one or more locking channels. The housing can be configured to be secured to the other of the panel and the support structure. Furthermore, the one or more engagement features can be configured to rotate the locking pin as the locking pin is inserted into the housing and cause the one or more flanges to rotate into said locking channel, thereby locking the panel to the support structure.

Additionally, an implementation of a melt-bondable panel mounting bracket for mounting an object can include a body. The melt-bondable panel mounting bracket can also include one or more bonding protrusions extending generally away from the body. Furthermore, the melt-bondable panel mounting bracket can include one or more ridges extending transversely from the one or more bonding protrusions. The one or more bonding protrusions are configured to be heated and pressed into a resin-based panel. The heating and pressing of the bonding protrusions into the resin-based panel can cause resin of the resin-based panel to melt and flow over the one or more ridges, thereby creating a mechanical bond between the panel and the melt-bondable panel mounting bracket.

An implementation of a decorative panel system can include at least one decorative resin-based architectural panel. The resin-based panel can include a visible outside surface, an opposing mounting surface, and a thickness extending between the outside surface and the mounting surface. The system can also include a melt-bondable panel mounting bracket, which in turn can include at least one bonding protrusion. The at least one bonding protrusion can include at least one ridge extending in a generally transverse direction from the at least one bonding protrusion. The at least one bonding protrusion can be secured into the mounting surface of the resin-based panel. Additionally, the at least one bonding protrusion can extend a distance into the resin-based panel less than the thickness of the resin-based panel. Melted resin can at least partially surround the at least one bonding protrusion and extend into the at least one flow recess. The system can further include a hardware component that can couple the melt-bondable panel mounting bracket to a support structure.

In addition to the foregoing, an implementation of a method of mounting a panel to a support structure can involve securing one of a locking pin and a housing to a support structure. The method can also involve securing the other of the locking pin and the housing to a panel. Additionally, the method can involve inserting the locking pin into the housing, thereby causing the locking pin to automatically rotate relative to the housing into a locked position. When in the locked position, the housing can prevent the locking pin from being removed from the housing.

Additional features and advantages of exemplary implementations of the present invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. It should be noted that the figures are not drawn to scale, and that elements of similar structure or function are generally represented by like reference numerals for illustrative purposes throughout the figures. Understanding that these drawings depict only typical embodiments of the invention and are not therefore to be considered to be limiting of its scope, the invention will be described and explained with additional specificity and detail through the use of the accompanying drawings in which:

FIG. 7 illustrates a schematic view of a panel system including a plurality of panels mounted to a support structure via a plurality of twist-lock mounting assemblies;

FIG. 8 illustrates an enlarged side-view of the melt-bondable panel mounting bracket of FIG. 1;

FIG. 9 illustrates an elevated, side perspective-view of the melt-bondable panel mounting bracket of FIG. 8;

DETAILED DESCRIPTION OF THE PREFERRED EMBODIMENTS

Figure 1:
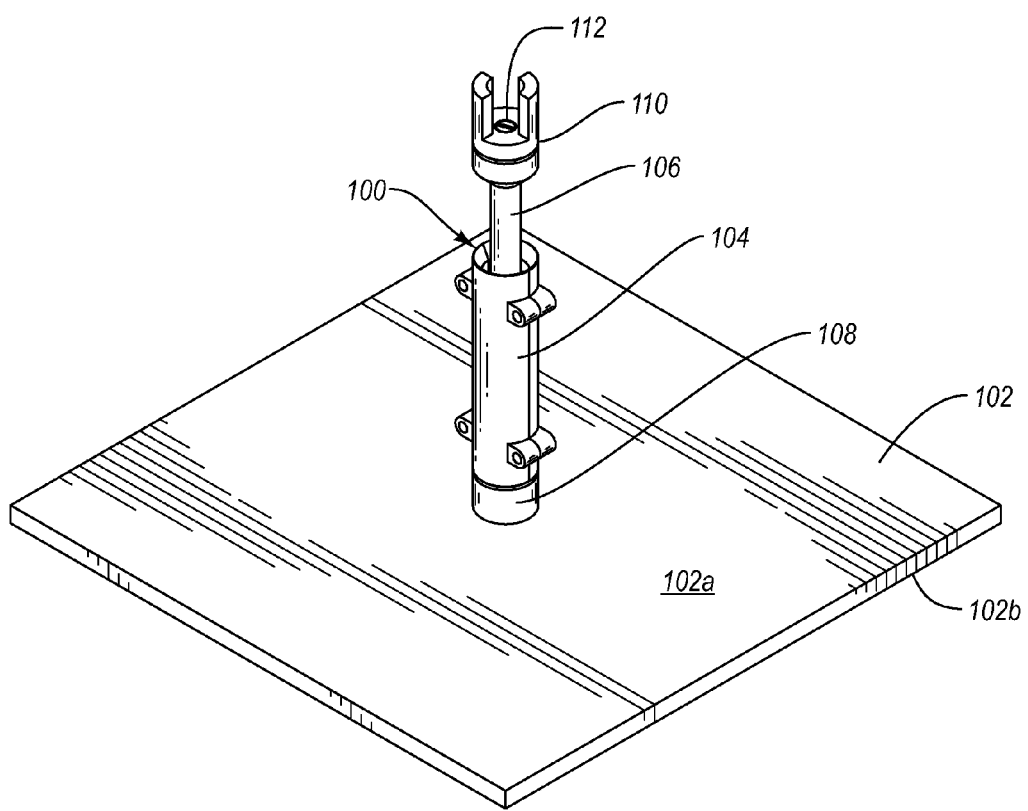
FIG. 1 illustrates an elevated perspective-view of a twist-lock mounting assembly secured to a panel via a melt-bondable panel mounting bracket in accordance with an implementation of the present invention.

The present invention is directed to systems, methods, and apparatus for mounting panels as partitions, displays, barriers, treatments, or other structure with increased functional versatility. In particular, various components, systems, and methods described herein allow panels to be quickly and efficiently assembled and disassembled with relative ease. For example, one or implementations of the present invention can include a twist-lock mounting assembly configured to releasably secure a decorative architectural panel to a support structure. One or more other implementations can include a melt-bondable panel mounting bracket for mounting an object, such as a decorative architectural resin-based, to a support structure. Such can provide a secure and reliable way to mount panels that also significantly reduces the time and labor needed to mount and/or dismount panels to a structure.

For instance, such implementations allow a user to dismount the panel from the support structure by pressing the mounting components together a second time, thereby releasing the locking mechanism holding the mounting components together. The ability to quickly mount and dismount panels can allow for easy access to lighting, HVAC, or other components behind a panel for maintenance purpose or otherwise. Furthermore, implementations of a twist-lock mounting assembly can allow a user to quickly and easily reconfigure or otherwise change the aesthetic of a given design space by switching or otherwise reconfiguring a set of panels mounted therein.

In addition to the foregoing, systems and components of the present invention can help reduce the likelihood of damaging the panels. For instance, one or more implementations allow a panel to be mounted to a support structure by simultaneously pressing multiple mounting components secured to the panel together with corresponding mounting components secured to the support structure. Thus, such implementations can eliminate the need for use of tools in close proximity to a panel during the mounting process, and thereby reduce the likelihood of scratching the panel. Furthermore, the ability to simultaneously connect and disconnect all mounting hardware can eliminate damage associated with removing individual standoffs one at a time.

In addition to providing a secure, yet easily configurable, mount of the panels to a structure, one or more implementations can help magnify the aesthetic features of a mounted panel or set of panels. For example, one or more implementations provide mounting hardware that reduces or eliminates the visibility of hardware. For example, one or more implementations include a melt-bondable panel mounting bracket that can securely mount panels to a support structure without covering or otherwise obscuring any portion of the surfaces of the panels being displayed (i.e., the proximal display surfaces). Accordingly, a user can easily adapt implementations of the present invention to an environment of use and provide a number of secure mounting options.

As mentioned above, user (architects, designers, assemblers, etc.) may choose to use components of the present invention to mount resin panels because they can allow resin panels to be quickly and easily mounted with a reduced likelihood of damage, while also providing a pleasing aesthetic. As used herein, the terms "resin panel" and "resin-based panel" refer to panels comprising a substrate of one or more layers or sheets formed from any one of the following thermoplastic polymers (or alloys thereof). Specifically, such materials can include, but are not limited to, polyethylene terephthalate (PET), polyethylene terephthalate with glycol-modification (PETG), acrylonitrile butadiene-styrene (ABS), polyvinyl chloride (PVC), polyvinyl butyral (PVB), ethylene vinyl acetate (EVA), polycarbonate (PC), styrene, polymethyl methacrylate (PMMA), polyolefins (low and high density polyethylene, polypropylene), thermoplastic polyurethane (TPU), cellulose-based polymers (cellulose acetate, cellulose butyrate or cellulose propionate), or the like.

As a preliminary matter, implementations of the present invention are described herein primarily with reference to mounting panels, such as resin panels. One will appreciate, however, that a panel, particularly a resin-based panel, is only one type of "structure" which a user may mount using the components, systems, and methods described herein can be used. For example, a user can use implementations of the present invention to mount not only resin "panels," as such, but also glass panels, to a given support structure. Furthermore, one will appreciate that a user can use various components and mounting assemblies described herein to mount other types of structures having different material compositions, such as objects comprising wood, stone, fiberglass, or the like, which may or may not exhibit primarily panel-like dimensions as described herein. Reference herein, therefore, to panels, or even resin panels, as such, is primarily for convenience in description.

Referring now to the Figures, FIG. 1 illustrates a schematic diagram of a twist-lock mounting assembly 100 secured to a resin-based panel 102. Specifically, FIG. 1 illustrates a panel 102, such as a resin-based panel, having a display surface 102b and an opposing mounting surface 102a to which the twist-lock mounting assembly 100 (also referred to as a click-lock mounting assembly in some cases) is secured. As mentioned above, the twist-lock mounting assembly 100 can securely mount one or more panels 102 to a support structure, while allowing the panels 102 to be quickly and efficiently assembled, disassembled, and reconfigured with relative ease. This is possible, at least in part, because the twist-lock mounting assembly 100 may not require the use of multiple fasteners or other mounting hardware that require time and significant effort to use.

For example, FIG. 1 illustrates that the twist-lock mounting assembly 100 can comprise a housing 104 and a locking pin 106. As explained in greater detail below, a user can selectably lock the locking pin 106 within the housing 104 to secure the resin-based panel 102 to a support structure. More specifically, when a user inserts the locking pin 106 within the housing 104 and presses the locking pin 106 and housing 104 together a first time, the locking pin 106 can automatically lock within the housing 104. Similarly, when a user presses the locking pin 106 and housing 104 together a second time, the locking pin 106 can automatically unlock from the housing 104.

Thus, in order to secure resin-based panel 102, or a portion thereof, to a support structure, a user can secure one of the housing 104 and the locking pin 106 to the resin-based panel 102, and the other of the housing 104 and the locking pin 106 to a support structure (e.g., 156, FIG. 7). The user can then insert the locking pin 106 within the housing 104 and press the locking pin 106 and the housing 104 together, thereby locking the locking pin 106 within the housing 104 and securing the resin-based panel 102 to the support structure. In order to dismount the resin-based panel 102 from the support structure, the user can press the locking pin 106 and housing 104 together a second time, thereby automatically unlocking the locking pin 106 from the housing 104. Once unlocked from the housing 104, the user can pull the locking pin 106 out of the housing 104, and thus, dismount the resin-based panel 102 from the support structure.

More specifically, and as explained in greater detail below, as a user presses the locking pin 106 and the housing 104 together a first time, one of the housing 104 and locking pin 106 can automatically rotate relative to the other into a locked position. Once in the locked position, the housing 104 can prevent the locking pin 106 from being separated or pulled out of the housing 104. When the user presses the locking pin 106 and the housing 104 together a second time, one of the housing 104 and locking pin 106 can automatically rotate relative to the other from the locked position into a released position. Once in the released position, the housing 104 and the locking pin 106 can be separated; and thus, the user can pull the locking pin 106 from the housing 104, thereby dismounting the resin-based panel 102 from a support structure.

As previously mentioned, a user can secure one of the housing 104 and the locking pin 106 to the resin-based panel 102, and the other of the housing 104 and the locking pin 106 to the support structure. For example, FIG. 1 illustrates the housing 104 secured to the resin-based panel 102, and the locking pin 106 free so as to be able to be secured to a support structure (e.g., via connector 110). In alternative implementations, however, a user can secure the locking pin 106 to the resin-based panel 102, and the housing 104 to the support structure.

Thus, one will appreciate in light of the disclosure herein that the twist-lock mounting assembly 100 can include a first end (i.e., the housing 104 or the locking pin 106) configured to be secured to a resin-based panel 102. For example, as shown in FIG. 1, the twist-lock mounting assembly 100 can include a panel mounting connector 108 configured to secure one end (i.e., the housing 104) to the resin-based panel 102. As explained in greater detail below, in at least one implementation the panel mounting connector 108 can comprise a melt-bondable panel mounting bracket. The melt-bondable panel mounting bracket can allow a user to secure the twist-lock mounting assembly 100 to the resin-based panel 102, while also hiding or concealing any hardware from a facing view of the resin-based panel 102. Alternatively, the panel mounting connector 108 can include a standoff screw and cap, a bracket, a flange, an adhesive, or other suitable hardware component capable of securing the twist-lock mounting assembly 100 to a panel 102.

Additionally, the twist-lock mounting assembly 100 can include a second end (i.e., the housing 104 or the locking pin 106) configured to be secured to a support structure. For example, as shown in FIG. 1, the twist-lock mounting assembly 100 can include a connector 110 configured to secure the locking pin 106 to a support structure. The connector 110 can include a bracket 110 as illustrated in FIG. 1. Alternatively, the connector 110 can include a screw, a flange, an anchor, an adhesive, or other suitable hardware component capable of securing the twist-lock mounting assembly 100 to a support structure.

The twist-lock mounting assembly 100 can further include a pivot mechanism. The pivot mechanism can allow one end (i.e., the housing 104 or the locking pin 106) of the twist-lock mounting assembly 100 to rotate or swivel relative to the other. For example, the twist-lock mounting assembly 100 can include a pivot mechanism configured to pivotally secure the panel mounting connector 108 to the housing 104. In such implementations, the pivot mechanism can allow the housing 104 to rotate relative to the locking pin 106, into and out of the locked position, while the locking pin 106, resin-based panel 102, and support structure remain rotationally fixed.

Alternatively, FIG. 1 illustrates that the twist-lock mounting assembly 100 can include a pivot pin 112 configured to pivotally secure the locking pin 106 to the connector 110. In particular, the pivot pin 112 can allow the connector 110 to freely rotate about the locking pin 106. The pivot pin 112 can thus allow the locking pin 106 to rotate relative to the housing 104, into and out of the locked position, while the housing 104, resin-based panel 102, and support structure remain rotationally fixed.

As discussed above, depending upon the location and configuration of the pivot mechanism, either the housing 104 or the locking pin 106 can rotate or swivel relative to the other in and out of the locked and released positions. To aid in the ease of description, however, the remainder of the detailed description describes the locking pin 106 rotating relative to the housing 104. One will appreciate, nonetheless, that the present invention is not so limited, and that the scope of the invention can be practiced in a wide variety of ways and with a wide variety of components in accordance with the principles disclosed herein.

Figure 2:
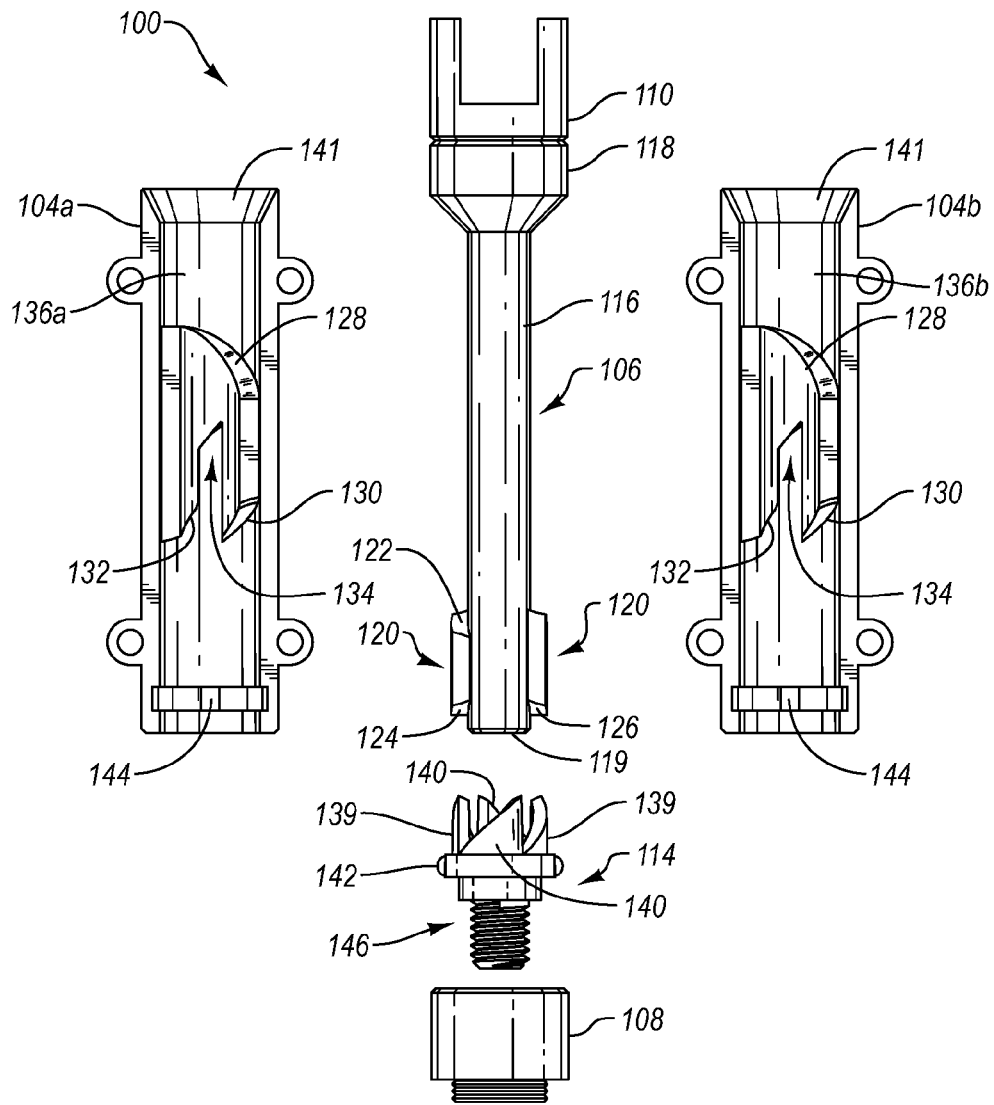
FIG. 2 illustrates an exploded side-view of the twist-lock mounting assembly of FIG. 1.

FIG. 2 and the corresponding text, shows or describes particular details of the individual components of the twist-lock mounting assembly 100. For example, FIG. 2 illustrates that the housing 104 can include a first housing component 104a and a second housing component 104b, which, in one implementation, are effectively duplicates of each other. Additionally, FIG. 2 illustrates that the twist-lock mounting assembly 100 can further include a crown disk 114. As explained in greater detail below, the crown disk 114 can work in conjunction with the housing 104 to cause the locking pin 106 to automatically rotate relative to the housing 104 into and out of the locked and released positions.

As FIG. 2 illustrates, the locking pin 106 can include a shaft 116, a head 118, and an opposing tip 119. Furthermore, the locking pin 106 can include one or more flanges 120 or extrusions that extend radially outward from the outer surface of the shaft 116. For example, FIG. 2 illustrates that the locking pin 106 can include a pair of flanges 120 positioned on opposing sides of the shaft 116. In alternative implementations, the locking pin 106 can include three, four, six, or any number of flanges 120.

Furthermore, the flanges 120 can include one or more engagement surfaces configured to work cooperatively with corresponding features of the housing 104 and crown disk 114 to cause the locking pin 106 to automatically rotate between the locked and released positions. For example, FIG. 2 illustrates that each flange 120 can include an upper helical surface 122, a first lower helical surface 124, and a second lower helical surface 126. In alternative implementations, each flange 120 can comprise only one lower helical surface, or can include two upper helical surfaces. In any event, each flange 120 can include sufficient engagement surfaces to allow the locking pin 106 to automatically rotate relative to the housing 104, as explained in greater detail below.

FIG. 2 illustrates that the upper helical surface 122 can extend from the top end (i.e., the end of the flange 120 closest to the head 118) toward the bottom end (i.e., the end of the flange 120 closest to the tip 119) of the flange 120, and counter clockwise around the shaft 116. The first lower helical surface 124 can extend from the bottom end toward the top end of the flange 120, and clockwise around the shaft 116. FIG. 2 additionally illustrates that the second lower helical surface 126 can extend from the bottom end toward the top end of the flange 120, and clockwise around the shaft 116.

As mentioned previously, the housing 104 can include features configured to work in conjunction with the flanges 120 to cause the locking pin 106 to automatically rotate within the housing 104(a, b). More specifically, each of the first housing component 104a and the second housing component 104a can include one or more engagement features configured to rotate the locking pin 106 as it is inserted and withdrawn from the housing 104. The one or more engagement features can also lock the locking pin 106 within the housing 104 when the locking pin 106 is in the locked position.

For example, FIG. 2 illustrates that each housing component 104a, 104b can include an upper helical ledge 128 (also referred to as a first tapered ledge in some cases), a first lower helical ledge 130 (also referred to as a second tapered ledge in some cases), a second lower helical ledge 132 (also referred to as a second tapered ledge in some cases), and a locking channel 134. Each of the helical ledges 128, 130, 132 can extend generally radially outward from the inner surfaces 136a, 136b of the housing components 104a, 104b toward the center of the housing 104. Furthermore, the upper helical ledges 128 can extend generally in a direction from an upper end (i.e., the end configured to receive the locking pin 106) toward a lower end (i.e., the end configured to hold the crown disk 114) of the housing 104.

Figure 3:
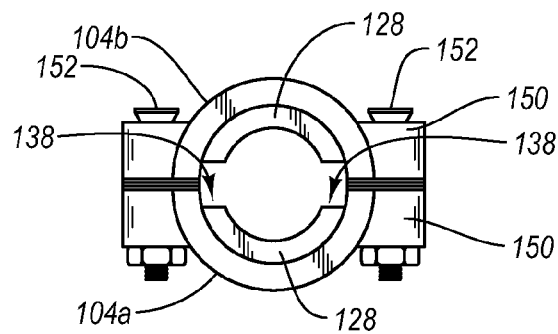
FIG. 3 illustrates a top view into the housing of the twist-lock mounting assembly of FIG. 1.

Additionally, the upper helical ledges 128 can extend only partially around the circumference of the inner surfaces 136a, 136b of the housing components 104a, 104b. Thus, as shown in FIG. 3, the upper helical ledges 128 can form a pair of grooves or openings 138. The grooves 138 can allow the flanges 120 of the locking pin 106 to pass into and out of the housing 104. Thus, when the locking pin 106 is rotationally aligned with the housing 104 so that the flanges 120 of the locking pin 106 can pass through the grooves 138 in or out of the housing 104, the locking pin 106 is in the "released position."

Referring again to FIG. 2, in addition to upper helical ledges 128, the opening of the housing 104 can include tapered edges 141. The tapered edges 141 can help guide the locking pin 106 into the housing 104. More specifically, the tapered edges 141 can help ensure that as a user presses the locking pin 106 toward the housing 104, so that the locking pin 106 will enter into the housing 104 even if the user has not completely aligned the locking pin 106 and the opening of the housing 104.

As explained in greater detail below, when a user inserts the locking pin 106 into the housing 104, the first and second lower helical surfaces 124, 126 of the locking pin 106 can engage and slide along the upper helical ledges 128. The helical configuration of the upper helical ledges 128 can cause the locking pin 106 to automatically rotate into the released position as the user inserts the locking pin 106 into the housing 104. One will appreciate in light of the disclosure herein that the upper helical ledges 128 can automatically rotate the locking pin 106 into the released position no matter the initial rotational alignment of the locking pin 106 relative to the housing 104.

Referring again to FIG. 2, the locking channels 134 can extend in a direction generally from the bottom toward the top of the housing 104 toward the upper helical ledges 128. The locking channels 134 can further extend from the radially innermost surface of the upper helical ledges 128 radially outward toward the inner surfaces 136a, 136b of the housing 104. The locking channels 134 can additionally comprise an opening towards the bottom end of the housing 104, but have a top end enclosed by the upper helical ledges 128. Thus, locking channels 134 can prevent the flanges 120, and thus the locking pin 106, from being withdrawn from the housing 104. Thus, when the locking pin 106 is aligned with the housing 104 so that the flanges 120 of the locking pin 106 are within the locking channels 134, the locking pin 106 is in the "locked position."

As FIG. 2 illustrates, the first lower helical ledge 130 can extend in a direction from the bottom to the top of the housing 104, and circumferentially along the inner surface 136a, 136b of the housing 104. Additionally, the first lower helical ledge 130 can extend more and more radially outward from the inner surface 136a, 136b of the housing 104 as the first lower helical ledge 130 extends generally up the housing 104 toward the top end of the housing 104. Along similar lines, the second lower helical ledge 132 can extend in a direction from the top to the bottom of the housing 104, and circumferentially along the inner surface 136a, 136b of the housing 104.

As explained in greater detail below, when a user inserts the locking pin 106 into the housing 104 a first time and begins withdrawing the locking pin 106 toward the upper end of the housing 104, the upper helical surfaces 122 of the locking pin 106 can engage and slide along the second helical ledge 132. The helical configuration of the second helical ledge 132 can cause the locking pin 106 to automatically rotate at least partially toward the locked position. Along similar lines, as a user presses the locking pin 106 toward the crown disk 114, and then begins withdrawing the locking pin 106 from the housing 104, the upper helical surfaces 122 of the locking pin 106 can engage and slide along the first helical ledge 130. The helical configuration of the first helical ledge 130 can cause the locking pin 106 to automatically rotate at least partially toward the released position.

In addition to the engagement features (i.e., upper helical ledge 128, first lower helical ledge 130, and second lower helical ledge 132) of the housing 104, the crown disk 114 can also help rotate the locking pin 106 into and out of the locked and released positions. In particular, the crown disk 114 can include a plurality of protrusions configured to receive and rotate the locking pin 106. For example, FIG. 2 illustrates that the crown disk 114 can include four helical protrusions 139, 140 (also referred to as helical ledges in some cases). In particular, the crown disk 114 can include a first pair of helical protrusions 139 and a second pair of helical protrusions 140. The helical protrusions 139, 140 can extend circumferentially around the housing 104 and generally toward the upper end of the housing 104.

As explained in greater detail below, as a user presses the locking pin 106 toward the crown disk 114 from the released position, the first lower helical surfaces 124 of the locking pin 106 can engage and slide along the first pair of helical projections 139. The helical configuration of the first pair of helical projections 139 can cause the locking pin 106 to automatically rotate at least partially toward the locked position. Along similar lines, as a user presses the locking pin 106 toward the crown disk 114 from the locked position, the first lower helical surfaces 124 of the locking pin 106 can engage and slide along the second pair of helical protrusions 140. The helical configuration of the second pair of helical protrusions 140 can cause the locking pin 106 to automatically rotate at least partially toward the released position.

In addition to the helical protrusions 139, 140, the crown disk 114 can include one or more pegs 142 extending radially outward from the crown disk 114. For example, FIG. 2 shows that the crown disk 114 can include a pair of pegs 142 disposed on opposing sides of the crown disk 114. Furthermore, as FIG. 2 illustrates, the housing 104 can include corresponding recesses 144 configured to receive the pegs 142 of the crown disk 114. The interlocking recesses 144 and pegs 142 can help ensure that the crown disk 114 cannot rotate relative to the housing 104, which can help ensure that the protrusions 139, 140 crown disk 114 remains in proper orientation relative to the engagement features of the housing 104. One will appreciate in light of the disclosure herein that proper alignment between the crown disk 114 and the housing 104 can help ensure that the crown disk 114 and the housing 104 can stay secure, and thus properly cause the locking pin 106 to rotate into and out of the released and locked positions.

As previously mentioned, one end (i.e., the locking pin 106 or the crown disk 114) of the twist-lock mounting assembly 100 can include a panel mounting connector configured to secure the twist-lock mounting assembly 100 to a panel. As shown in FIG. 2, in one implementation of the present invention, the twist-lock mounting assembly 100 can include a melt-bondable panel mounting bracket 108 configured to secure the crown disk 114 to a resin-based panel 102. In the illustrated implementation, the crown disk 114 can include a male connector 146 configured to engage a corresponding female receptacle within the melt-bondable panel mounting bracket 108 (or vice versa). Alternatively, the melt-bondable panel mounting bracket 108 and the crown disk 114 can include corresponding features having a snap-fit engagement, or other suitable connection capabilities.

In some implementations, the twist-lock mounting assembly 100 may not include a melt-bondable panel mounting bracket 108 or other panel connector. In such implementations, the crown disk 114 can secure the twist-lock mounting assembly 100 directly to a resin-based panel 102. For example, a user can insert the male connector 146 of the crown disk 114 through a hole in the resin-based panel 102, and secure a mounting cap to the male connector 146 on the other side of the resin-based panel 102.

As previously mentioned, the housing 104 can include a first housing component 104a and a second housing component 104b. For example, FIG. 3 illustrates that the first and second portions 104a, 104b of the housing can include supports 150, through which a user can secure fasteners, such as screws 152, to hold the first and second portions 104a, 104b of the housing together. In alternative implementations, a user can secure the first and second portions 104a, 104b of the housing together with adhesives, VELCRO, rivets, clips, and other fasteners.

Each of the components of the twist-lock mounting assembly 100 described herein above with reference to FIG. 1-3 can comprise a strong, light-weight material. For example, according to some implementations of the present invention, the components of the twist-lock mounting assembly 100 can each comprise a polymer, or a metal or alloy thereof, such as for example, aluminum. One will appreciate, however, that these and other components described herein can be prepared from any number of synthetic or naturally occurring resins, rubbers, glass, ceramics, and/or composites thereof.

FIGS. 4A-4F, and the corresponding text, show or describe in further detail the process of a user inserting a locking pin 106 into the housing of the twist-lock mounting assembly 100 to lock the locking pin 106 within the housing 104. More specifically, FIGS. 4A-4F show how a user can insert the locking pin 106 into the housing 104, thereby causing the locking pin 106 to automatically rotate relative to the housing 104 into the locked position. As described above, once in the locked position, the housing 104 can prevent the locking pin 106 from being removed therefrom.

To aid in description, FIGS. 4A-4F, and the corresponding text, describe the process of locking the housing 104 and locking pin 106 of a twist-lock mounting assembly 100 with respect to a single cross-section component 104a or 104b of housing 104. One will appreciate in light of the disclosure herein, however, that similar or corresponding interactions can also occur simultaneously between the locking pin 106 and the other housing 104 component (or cross-section) 104a or 104b.

Figure 4A:
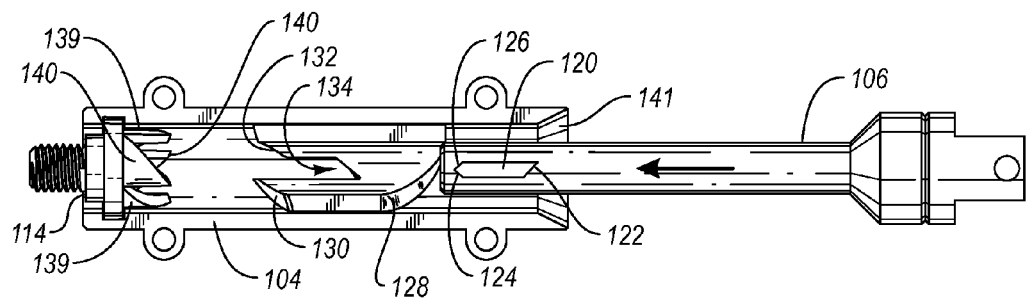
FIG. 4A illustrates a side view of a locking pin being inserted into the housing of the twist-lock mounting assembly of FIG. 2 in accordance with an implementation of the present invention.

Referring now to FIG. 4A, a user can insert the locking pin 106 within the opening of the housing 104. As mentioned above, the tapered surfaces 141 of the opening of housing 104 can help guide the locking pin 106 into the housing 104. Once within the center cavity of the housing 104, the user can further insert the locking pin 106 into the housing 104 as indicated by the arrow of FIG. 4A.

As the user guides the locking pin 106 toward the crown disk 114, one or more of the first lower helical surface 124 and the second lower helical surface 126 can engage and slide along the upper helical ledge 128. The helical configuration of the upper helical ledge 128 can guide the lower helical surface(s) 124, 126 along the length of the upper helical ledge 128, and thereby, cause the locking pin 106 to rotate clockwise about its axis as shown by the arrow of FIG. 4B.

Figure 4B:
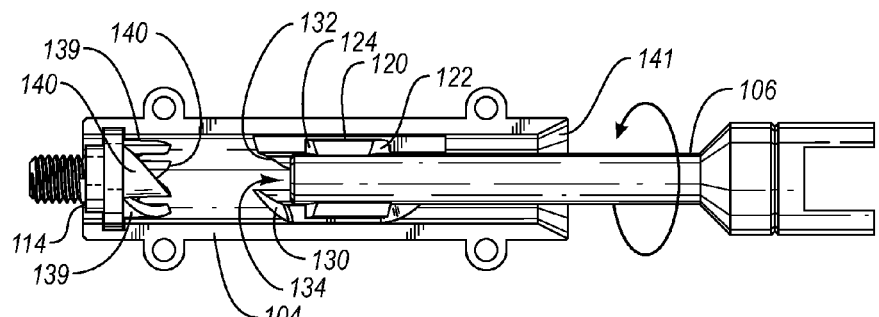
FIG. 4B illustrates a side view of the engagement features of the housing of the twist-lock mounting assembly of FIG. 2 causing the locking pin to rotate toward a released position in accordance with an implementation of the present invention.

More specifically, the upper helical ledge 128 can cause the locking pin 106 to rotate into the released position (i.e., the rotational position of the locking pin 106 relative to the housing 104 illustrated by FIG. 4B). In other words, the upper helical ledge 128 can cause the locking pin 106 to rotate until the flanges 120 are aligned with the grooves 138 (FIG. 3) of the housing 104. One will appreciate that the upper helical ledge 128 can cause the locking pin 106 to automatically rotate into the released position, regardless of the rotational orientation in which the user originally positions the flanges 120 with respect to the upper helical ledge 128.

Thus, depending upon the original rotational orientation of the locking pin 106, the upper helical ledges 128 of the housing 104 can cause the locking pin 106 to rotate between approximately 0 degrees and approximately 90 degrees. For example, when the original rotational orientation of the flanges 120 of the locking pin 106 are rotated approximately 90 degrees relative to the released position, as FIG. 4A illustrates, the upper helical ledges 128 can cause the locking pin 106 to rotate approximately 90 degrees. On the other end of the spectrum, when the original rotational orientation of the flanges 120 of the locking pin 106 are rotationally aligned with the grooves 138, the upper helical ledges 128 may not cause the locking pin 106 to rotate at all.

Figure 4C:
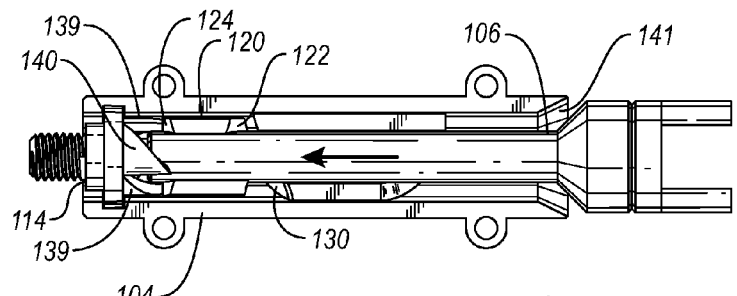
FIG. 4C illustrates a side view of a locking pin being inserted past the engagement features of the housing of the twist-lock mounting assembly of FIG. 2 and engaging a crown disk of the twist-lock mounting assembly of FIG. 2 in accordance with an implementation of the present invention.

Once the housing 104 has rotated the locking pin 106 in the released position, the user can further advance the locking pin 106 along the length of the housing 104 as indicted by the arrow of FIG. 4C. More specifically, the user can advance the flanges 120 of the locking pin 106 beyond the engagement features (i.e., 128, 130, 132) of the housing 104 and into a gap between the crown disk 114 and the internal features, as FIG. 4C illustrates. One will appreciate in light of the disclosure herein that the gap, or distance, between the end of the lower helical ledges 130, 132 and the top of the helical protrusions 139, 140 can provide a space within which the flanges 120 may rotate freely relative to the housing 104.

Figure 4D:
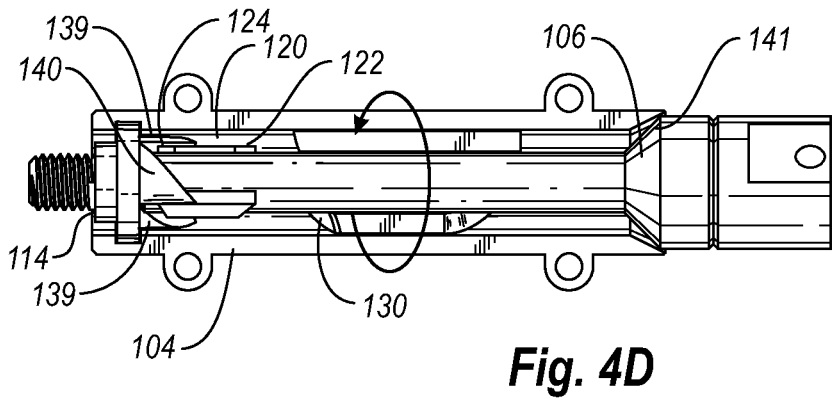
FIG. 4D illustrates a side view of the crown disk of the twist-lock mounting assembly of FIG. 2 causing a locking pin to rotate from the released position toward the locked position in accordance with an implementation of the present invention.

As the user further advances the locking pin 106 in the housing 104, the flanges 120 of the locking pin 106 can contact and slide along the first pair of helical protrusions 139 of the crown disk 114. In particular, the first lower helical surface 124 of each flange 120 can engage and slide along a helical protrusion of the first pair of helical protrusions 139. The helical shape of the first pair of helical protrusions 139 can cause the flanges 120 of the locking pin 106 to rotate clockwise toward the locked position, as indicated by the arrow of FIG. 4D. As previously mentioned, the locked position is the rotational position of the locking pin 106 relative to the housing 104 when the flanges 120 are rotationally aligned with the locking channels 134 of the housing 104, as illustrated in FIG. 4F.

One will appreciate in light of the disclosure herein that in order to transition from the released position to the locked position, the locking pin 106 can rotate approximately ninety degrees about its longitudinal axis. Thus, according to some implementations of the present invention, the first pair of helical protrusions 139 of the crown disk 114 can cause the locking pin 106 to rotate between approximately 1 degree and approximately 90 degrees relative to the released position. According to additional implementations, the first pair of helical protrusions 139 of the crown disk 114 can cause the locking pin 106 to rotate between approximately 20 degrees and approximately 60 degrees relative to the released position. According to yet further implementations of the present invention, the first pair of helical protrusions 139 of the crown disk 114 can cause the locking pin 106 to rotate approximately 45 degrees relative to the released position.

Figure 4E:
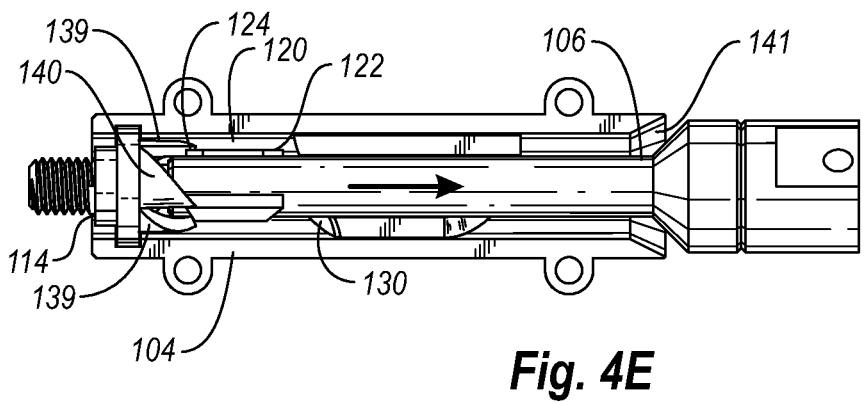
FIG. 4E illustrates a side view of the engagement features of the housing of the twist-lock mounting assembly of FIG. 2 causing a locking pin to rotate into the locked position in accordance with an implementation of the present invention.
Figure 4F:
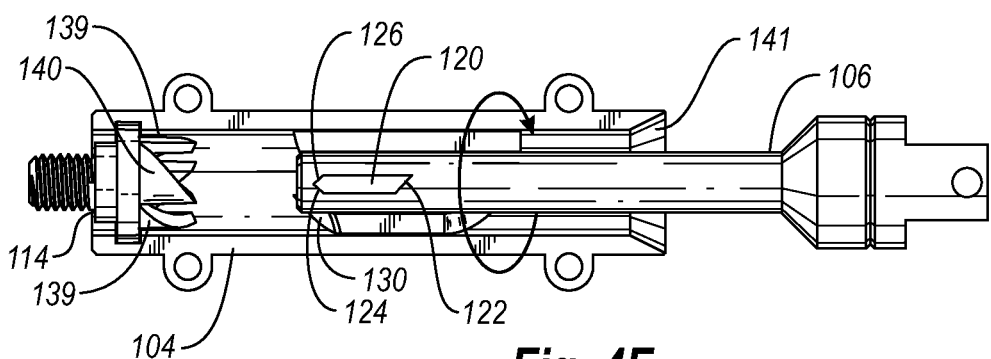
FIG. 4F illustrates a side view of a locking pin being refracted into a locking channel of the housing of the twist-lock mounting assembly of FIG. 2 in accordance with an implementation of the present invention.

In any event, once the locking pin 106 has been at least partially rotated toward the locked position, the user can retract the locking pin 106 away from the crown disk 114, as indicated by the arrow of FIG. 4E. As shown in FIG. 4E, as the user retracts the locking pin 106 away from the crown disk 114, the flanges 120 can contact and slide along the second lower helical ledges 132 and/or the first lower helical ledges 130 of the housing 104. The second lower helical ledges 132 of housing 104 can cause the locking pin 106 to finish rotating into the locked position, as indicated by the arrow of FIG. 4F.

The amount of rotation the second lower helical ledges 132 and/or the first lower helical ledges 130 cause the locking pin 106 to rotate can be based upon how much the first pair of helical protrusions 139 rotate the locking pin. Thus, according to some implementations, the second lower helical ledges 132 and/or the first lower helical ledges 130 can cause locking pin 106 to rotate between approximately 0 degrees and approximately 90 degrees relative to the released position. In additional implementations, the second lower helical ledges 132 and/or the first lower helical ledges 130 can cause the locking pin 106 to rotate between approximately 20 degrees and approximately 60 degrees relative to the released position. According to yet further implementations of the present invention, the second lower helical ledges 132 and/or the first lower helical ledges 130 can cause the locking pin 106 to rotate approximately 45 degrees relative to the released position.

In any event, once rotated into the locked position, the user can retract the locking pin 106 until the flanges 120 of the locking pin 106 are positioned within locking channels 134 of the housing 104. When the flanges 120 are positioned within the locking channels 134, the locking channels 134 can prevent the locking pin 106 from being retracted from the housing 104 by the user, the weight of a panel(s) secured to the twist-lock mounting assembly 100, or other forces.

The description herein describes the user retracting the locking pin 106 from the crown disk 114 into the locking channels 134 or out of the housing 104. Depending upon the configuration of the resin-based panel 102 and support structure secured to the twist-lock mounting assembly 100, however, the weight of the panel(s) or gravity acting on the locking pin 106 can automatically force the locking pin 106 toward the locking channels 134 or opening of the housing 104. Thus, in some implementations, the user need only press the locking pin 106 against the crown disk 114, and the weight of the panel(s) 102 can force the flanges 120 of the locking pin 106 into the locking channels 134. For example, when a user mounts a panel(s) 102 to an overhead support structure, such as for example, a ceiling, the weight of the panel(s) 102 (in combination with the engagement features) can force the locking pin 106 to move from the crown disk 114 into the locking channels 134. In such implementations, the weight of the panel(s) 102 can bias flanges 120 of the locking pin 106 into the locking channels 134, thereby helping prevent the locking pin 106 from inadvertently releasing from the housing 104.

Additionally, according to some implementations, the twist-lock mounting assembly 100 can include a mechanism for preventing the locking pin 106 from unintentionally unlocking from the housing 104, for instance, in the cause of seismic activity. For example, twist-lock mounting assembly 100 can include a securing mechanism, such as, for example, a cord, a pin, a hook, etc., that independently connects the locking pin 106 and the housing 104. Alternatively, the securing mechanism can secure the end of the twist-lock mounting assembly 100 attached to the resin-based panel 102 directly to the support structure. The securing mechanism can prevent a resin-based panel 102 from falling from a support structure if the locking pin 106 is unintentionally unlocked from the housing 104.

In some implementations, the twist-lock mounting assembly 100 can include a biasing mechanism configured to bias the flanges 120 of the locking pin 106 into the locking channel 134 of the housing 104. A biasing mechanism can help prevent the locking pin 106 from inadvertently releasing from the housing 104. Additionally, a biasing mechanism can allow a twist-lock mounting assembly 100 to mount a panel(s) to a wall or in other non-hanging configurations. For example, in some implementations, the twist-lock mounting assembly 100 can include a mechanical (e.g., spring), magnetic, or other mechanism configured to bias the locking pin 106 within the clocking channels 134.

In addition to allowing a resin-based panel 102 to be relatively easily mounted to a support structure 106, the twist-lock mounting assembly 100 can also allow a panel 102 to be relatively easily dismounted from a support structure 106. This can be particularly useful when there are backlights, electrical components, HVAC components, or other components behind the mounted panel 102 that need to be accessed from time to time. The ability to relatively quickly and easily dismount a panel can provide significant time and effort advantages, and also prevent panel damage common with dismounting panels using conventional hardware. In order to dismount the resin-based panel 102 from the support structure, a user can insert the locking pin 106 into the housing 104, thereby causing the locking pin 106 to automatically rotate relative to the housing 104 into the released position.

Figure 5A:
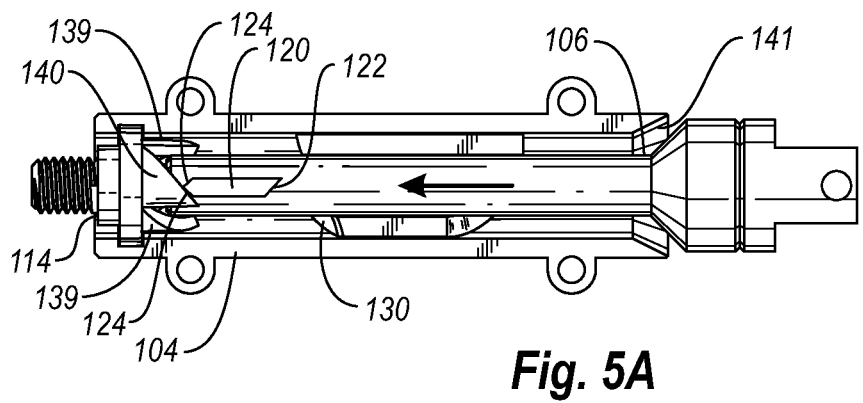
FIG. 5A illustrates a side view of a locking pin being inserted from the locked position past the engagement features of the housing of the twist-lock mounting assembly of FIG. 2 and engaging a crown disk of the twist-lock mounting assembly of FIG. 2 in accordance with an implementation of the present invention.

FIGS. 5A-5D, and the corresponding text, show or describe in further detail the process of a user inserting a locking pin 106 into the housing 104 of the twist-lock mounting assembly 100 to unlock the locking pin 106 from the housing 104. Referring to FIG. 5A, the user can advance the locking pin 106 from the locked position toward the crown disk 114, as indicated by the arrow of FIG. 5A. More specifically, the user can advance the flanges 120 of the locking pin 106 into a gap between the crown disk 114 and the engagement features of the housing 104.

Figure 5B:
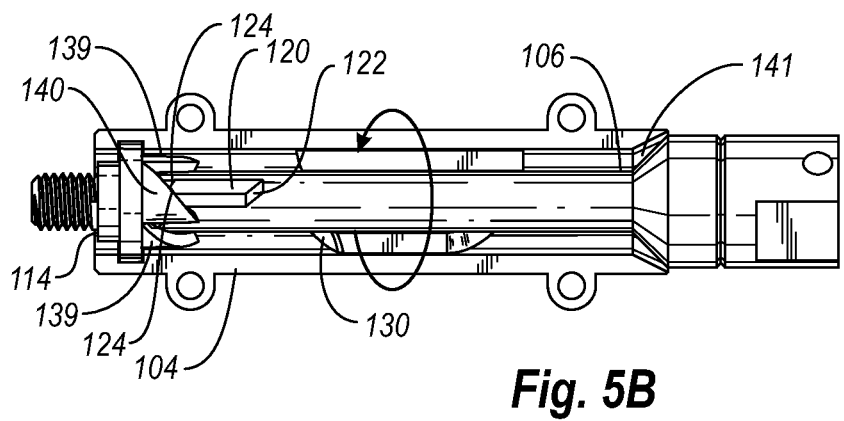
FIG. 5B illustrates a side view of a crown disk of the twist-lock mounting assembly of FIG. 2 causing a locking pin to rotate from the locked position toward the released position in accordance with an implementation of the present invention.

As the user advances the locking pin 106 toward the crown disk 114, the flanges 120 of the locking pin 106 can contact and slide along the second pair of helical protrusions 140 of the crown disk 114. In particular, the first lower helical surface 124 of each flange 120 can engage and slide along a helical protrusion of the second pair of helical protrusions 140. The helical shape of the second pair of helical protrusions 140 can cause the flanges 120 of the locking pin 106 to rotate clockwise toward the released position, as indicated by the arrow of FIG. 5B.

One will appreciate in light of the disclosure herein that the flanges 120 can engage the second pair of helical protrusions 140 when the user advances the locking pin 106 from the locked position toward the crown disk 114. Thus, when a user advances the locking pin 106 from the locked position toward the crown disk 114, the helical protrusions 139, 140 can automatically rotate the locking pin 106 toward the released position. In order to transition from the locked position to the released position, the locking pin 106 can rotate approximately ninety degrees about its longitudinal axis. Thus, according to some implementations, the second pair of helical protrusions 140 of the crown disk 114 can cause the locking pin 106 to rotate between approximately 1 degree and approximately 90 degrees relative to the locked position. According to additional implementations, the second pair of helical protrusions 140 can cause the locking pin 106 to rotate between approximately 20 degrees and approximately 60 degrees relative to the locked position. According to yet further implementations, the second pair of helical protrusions 140 can cause the locking pin 106 to rotate approximately 45 degrees relative to the locked position.

Figure 5C:
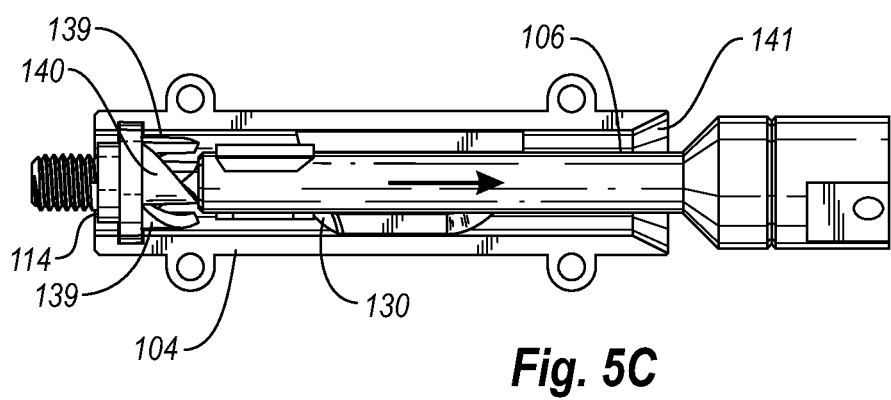
FIG. 5C illustrates a side view of a locking pin being retracted toward the engagement features of the housing of the twist-lock mounting assembly of FIG. 2 in accordance with an implementation of the present invention.
Figure 5D:
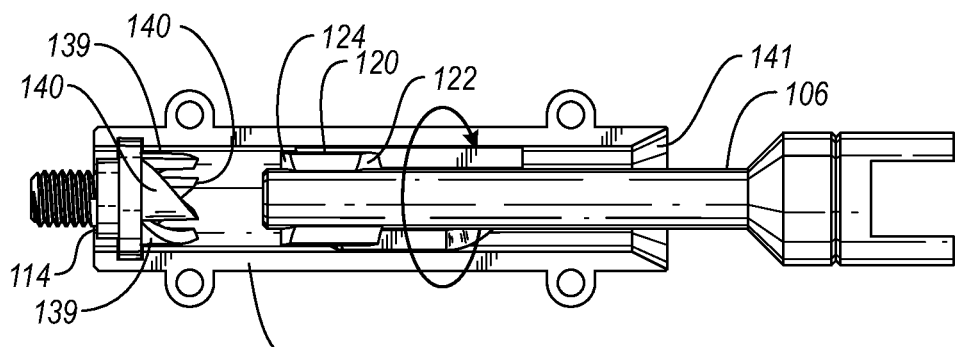
FIG. 5D illustrates a side view of the engagement features of the housing of the twist-lock mounting assembly of FIG. 2 causing a locking pin to rotate into the released position in accordance with an implementation of the present invention.

In any event, once the locking pin 106 has been at least partially rotated toward the released position, the user can retract the locking pin 106 away from the crown disk 114, as indicated by the arrow of FIG. 5C. As shown in FIG. 5D, as the user retracts the locking pin 106 away from the crown disk 114, the flanges 120 can contact and slide along the first lower helical ledges 130 and/or the second lower helical ledges 132 of the housing 104. The first lower helical ledges 130 of housing 104 can cause the locking pin 106 to finish rotating into the released position, as indicated by the arrow of FIG. 5D.

The amount of rotation the first lower helical ledges 130 and/or the second lower helical ledges 132 cause the locking pin 106 to rotate can be based upon how much the second pair of helical protrusions 140 rotate the locking pin 106. Thus, according to some implementations, the first lower helical ledges 130 and/or the second lower helical ledges 132 can cause locking pin 106 to rotate between approximately 0 degrees and approximately 90 degrees relative to the locked position. In additional implementations, the first lower helical ledges 130 and/or the second lower helical ledges 132 can cause the locking pin 106 to rotate between approximately 20 degrees and approximately 60 degrees relative to the locked position. According to yet further implementations of the present invention, the first lower helical ledges 130 and/or the second lower helical ledges 132 can cause the locking pin 106 to rotate approximately 45 degrees relative to the locked position.

In any event once rotated from the locked position into the released position, the user can retract the locking pin 106 past the engagement features. Specifically, when in the released position, the flanges 120 can pass through the grooves 138 and out of the housing 104. Thus, in order to dismount a resin-based panel 102 secured to a support structure via a twist-lock mounting assembly 100, a user need only press the locking pin 106 from the locked position against the crown disk 114 and the engagement features of the housing 104 can cause the locking pin 106 to automatically rotate into the released position.

As illustrated and described hereinabove, the locking pin 106 can comprise two flanges 120, the housing 104 can comprises two corresponding grooves 138 and two corresponding locking channels 134, and the crown disk 114 can comprise two corresponding pairs of helical protrusions 139, 140. One will appreciate that according to alternative implementations, the locking pin 106 can include one flange 120, the housing 104 can include one corresponding groove 138 and one locking channel 134, and the crown disk 114 can comprise one pair of helical protrusions 139, 140. According to yet further implementations, the locking pin 106 can include three or more flanges 120, the housing 104 can include three or more corresponding grooves 138 and three or more locking channels 134, and the crown disk 114 can include three or more corresponding pairs of helical protrusions 139, 140. According to yet additional implementations of the present invention, the number of the grooves 138, locking channels 134, and/or pairs of helical protrusions 139, 140 can be greater than the number of flanges 120.

Furthermore, the direction (i.e., counter clockwise or clockwise) of the helical surfaces 122, 124, 126, helical ledges 128, 130, 132, and helical protrusions 139, 140 can help determine the direction the locking pin 106 rotates within the housing 104. For example, the illustrated implementation shows that the locking pin 106 can rotate clockwise relative to the housing 104. In alternative implementations, the helical surfaces 122, 124, 126, helical ledges 128, 130, 132, and helical protrusions 139, 140 can be configured to automatically rotate the locking pin 106 in a counter-clockwise direction relative to the housing 104.

Figure 6:
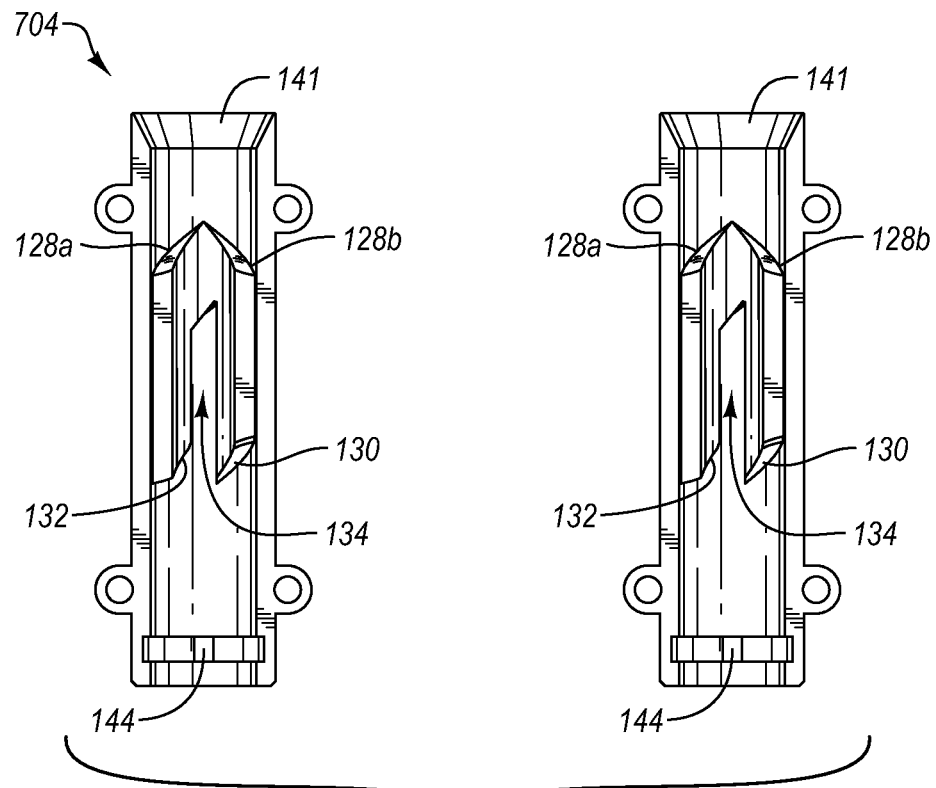
FIG. 6 illustrates an interior view of a housing in cross-section of a twist-lock mounting assembly in accordance with an implementation of the present invention.

One will appreciate in light of the disclosure herein that the various features of the housing 104 and crown disk 114 that can cause the locking pin 106 to rotate between the released and locked positions are not limited to the configurations shown and described in relation to FIGS. 1-5D. For example, FIG. 6 illustrates that each upper helical ledge 128 of the housing 104 can include two surfaces 128a, 128b instead of a single surface. Thus, the upper helical ledge 128 can be configured in any number of ways to cause the locking pin 106 to rotate into the released position. Similarly, the other helical components of the twist-lock mounting assembly 100 can include any number of different configurations adapted to rotate the locking pin 106 in and out of the released and locked positions. Thus, one will appreciate that the depicted and described embodiments are only illustrative of one implementation the present invention.

FIG. 7 illustrates a schematic diagram of a panel system 154 comprising a plurality of decorative architectural resin-based panels 102 mounted as a treatment to a support structure 156 (e.g., ceiling) via a plurality of twist-lock mounting assemblies 100 in accordance with an implementation of the present invention. One will appreciate that the resin-based panels 102 have at least one surface 102b that is displayed or visible to a viewer (i.e., the surfacing facing away from the support structure 156). In other words, because the resin-based panels 102 are secured to an end of the twist-lock mounting assembly 100, the surface opposite to which the twist-lock mounting assembly 100 is secured will be visible to a viewer. Accordingly, a user can configure the panel(s) 102 to provide a desired aesthetic.

For example, the panel(s) 102 can be transparent, translucent, and/or colored, as desired. When the system includes transparent or translucent resin-based panels 102, in some implementations the twist-lock mounting assembly 100 can be at least partially (if not entirely) hidden from view at least in part since none of the components of the twist-lock mounting assembly 100 may extend completely through any such resin-based panel(s) 102 (e.g., via any perforations therein). Furthermore, a user can form the resin-based panel(s) 102 to include embedded two or three-dimensional objects such as thatch, willow reed, coffee beans, bamboo, and similar objects in order to provide a desired aesthetic. Thus, one will appreciate that a user can create a desired aesthetic for the resin-based panel(s) 102 including any number or combinations of different features (e.g., color, transparency, surface texture, embedded objects, or printed images). Furthermore, a user can mount a variety of resin-based panels 102 each with similar or different aesthetic features to provide a desired overall aesthetic.

As previously discussed above, according to some implementations of the present invention, the twist-lock mounting assemblies 110 can secure the resin-based panels 102 to the support structure 100 in a manner that the visibility of the twist-lock mounting assemblies 100 is reduced or eliminated. For example FIG. 7 illustrates that no hardware may protrude from the display surface (i.e., the proximal, visible outside surface of the panels 102). According to alternative implementations, however, a screw, standoff cap, or other portion of a panel mounting connector 108 may protrude from the display surface 102b of a mounted resin-based panel 102.

The twist-lock mounting assemblies 100 can secure the resin-based panel(s) 102 at a standoff position from the support structure 156. In particular, height of the housing 104 and locking pin 106 when locked together can determine the length of the standoff at which the twist-lock mounting assembles 100 secure the resin-based panel(s) 102 to the support structure 156. Thus, a user can configure the height of twist-lock mounting assemblies 100 based on a desired standoff length. For example, according to some implementations, a user may desire, or the design space may, require a reduced standoff. In such cases, the user can configure the housing 104 and/or locking pin 106 with a reduced height. According to alternative implementations, the user may desire, or the design space may require, a larger standoff in order to create a desired acoustic, heating, visual, or other functional or aesthetic effect. In such cases, the user can configure the height of the housing 104 and/or locking pin 106 accordingly.

For example, according to some implementations of the present invention, the resin-based panel(s) 102 can be backlit via one or more light sources (not shown). In such implementations, it may be desirable to use a twist-lock mounting assembly 100 with sufficient height to help ensure that the various components of the twist-lock mounting assembly 100 (or their shadows) are not noticeably visible through the resin-based panel(s) 102. Additionally, the mounting surface 102a of the resin-based panel(s) 102, can include a diffuser film (not shown) to help evenly distribute light across the resin-based panel(s) 102. In such implementations, the user may desire to use a twist-lock mounting assembly 100 with sufficient height to help ensure there is enough space to effectively diffuse the light. According to yet additional implementations, the user may desire to use a twist-lock mounting assembly 100 with sufficient height to help create an acoustic effect, create space for storing a backlight or other components, or provide increased insulation. In any event, a user can select an appropriately sized twist-lock mounting assembly 100 based upon an intended environment of use.

As mentioned hereinabove, according to some implementations, a panel mounting connector 108 can secure one end of the twist-lock mounting assembly 100 to a resin-based panel 102. Although not seen in FIG. 7, one or more melt-bondable panel mounting brackets 108 (FIG. 1) can secure each resin-based panel 102 of the plurality of panels 102 to the support structure 156. The melt-bondable panel mounting brackets 108, in combination with the twist-lock mounting assemblies 100, can securely mount the resin-based panels 102 without damaging them, while also helping to magnify the aesthetic features of the resin-based panels 102.

For example, a user can heat and insert a portion of a melt-bondable panel mounting bracket 108 directly into the mounting surface 102a (FIG. 1) of a resin-based panel 102, albeit without passing completely through the resin-based panel 102. Thus, as shown in FIG. 7, the melt-bondable panel mounting brackets 108 can allow a twist-lock mounting assembly 100 to securely mount each resin-based panel 102 to the support structure 156 without covering or otherwise obscuring any portion of the display surfaces 102b of the resin-based panels 102. Furthermore, according to one or more implementations, the melt-bondable panel mounting brackets 108 and twist-lock mounting assembly 100 can be completely hidden from view. For example, FIG. 7 illustrates the resin-based panels 102 can be opaque, and can hide or conceal the melt-bondable panel mounting brackets 108 and twist-lock mounting assembly 100 from a facing view.

In alternative implementations, the resin-based panels 102 can be transparent or translucent. Thus, the melt-bondable panel mounting brackets 108 and twist-lock mounting assembly 100 may be at least partially visible through the resin-based panels 102. In such implementations, the melt-bondable panel mounting brackets 108 can have a color corresponding with the color of a resin-based panel 102. Thus, the melt-bondable panel mounting brackets 108a can blend in with the resin-based panel 102 and reduce their visibility. According to additional implementations, the melt-bondable panel mounting brackets 108 can have a color configured to increase their visibility through a transparent or translucent resin-based panel 102.

Just as various other panel connectors can secure an end of a twist-lock mounting assembly 100 to a resin-based panel 102, the various melt-bondable panel mounting brackets 108 of the present invention can couple other hardware components besides a twist-lock mounting assembly 100 to a resin-based panel 102. Thus, a user can use the various melt-bondable panel mounting brackets 108 described herein to secure a resin-based panel 102 to a support structure 156 in connection with, or independent of, a twist-lock mounting assembly 100. For example, a user can use a melt-bondable panel mounting bracket 108 in combination with standoff barrels, rods, cables, anchors, frames, or other hardware components or assemblies.

FIGS. 8 and 9 show a side view, and a bottom perspective-view of the melt-bondable panel mounting bracket 108, respectively. As such, FIGS. 8 and 9 illustrate that the melt-bondable panel mounting bracket 108 can include a body 160 that can include a bonding surface. As used herein, the term "bonding surface" refers to a surface(s) configured to be heated and pressed against the resin of a resin-based panel 102.

As mentioned previously, a user can press the melt-bondable mounting 108 directly into the resin of a resin-based panel 102. To aid in creating a bond between the melt-bondable panel mounting bracket 108 and a resin-based panel 102, the melt-bondable panel mounting bracket 108 can include one or more bonding features. For example, FIG. 8 illustrates that the bonding features can include a bonding protrusion 164 extending generally longitudinally away from the body 160.

Furthermore, one or more surfaces of the bonding protrusion 164 can include one or more roughened surfaces (e.g., ridged surfaces) or other features to increase the surface area to which resin can be bonded. For example, FIGS. 8 and 9 illustrate that the bonding protrusion 164 can include at least one bonding recess 166 extending therein in a generally lateral or transverse direction. As FIGS. 8 and 9 illustrate, each bonding recess 166 (also referred to as a groove in some cases) can at least partially define a ridge 167 extending generally laterally or transversely away from the bonding protrusion 164. Each ridge 167 (also referred to as a projection in some cases) can increase the surface area of the bonding protrusion 164, and thus, can help create a stronger bond between the resin and the melt-bondable panel mounting bracket 108.

FIG. 9 illustrates that melt-bondable panel mounting bracket 108 can include a single bonding protrusion 164 having an essentially circular shape. According to additional embodiments, however, the melt-bondable panel mounting bracket 108 can include any number of bonding protrusions 164 arranged in any number of configurations. For example, the bonding protrusion(s) 164 can have a linear, semi-circular, crossing, or other configuration. Furthermore, according to some implementations, the bonding protrusions 164 can have an aesthetically pleasing size and configuration. For example, the bonding protrusion(s) 164 can form various geometric shapes, such as, for instance, stars, circles, letters, or trade symbols. Thus, in some implementations, the bonding protrusion 164 can be at least partially visible through the resin-based panel 102 and add a desired aesthetic to a panel system 154.

To secure the melt-bondable panel mounting bracket 108 to a panel, a user can heat and then insert melt-bondable panel mounting bracket 108 directly into a surface of the resin-based panel 102. One will appreciate that the temperature to which the user heats the melt-bondable panel mounting bracket 108 can vary depending upon the type of resin-based panel 102 used. For example, a user can heat the melt-bondable panel mounting bracket 108 to a temperature between about 150 degrees Fahrenheit and about 400 degrees Fahrenheit. Once heated, the user can apply approximately 50 psi to approximately 300 psi to the melt-bondable panel mounting bracket 108 to force the melt-bondable panel mounting bracket 108 into a panel 102. In additional implementations, a user can heat the melt-bondable panel mounting bracket 108 to a temperature of between about 100 and about 500 degrees Fahrenheit and apply between approximately 20 psi and approximately 100 psi to bond the melt-bondable panel mounting bracket 108 to a panel 102.

As a user inserts the heated bonding protrusion 164 into a resin-based panel 102, the resin can melt and can flow into the bonding recesses 166 and around the bonding ridges 167. The resin of the resin-based panel 102 can then solidify, thereby sealing the bonding protrusion 164 into the resin-based panel 102. Thus, the bonding recesses 166 in combination with the ridge 167 can help mechanically prevent the melt-bondable panel mounting bracket 108 from being pulled out of the resin of a resin-based panel 102.

Each bonding protrusion 164 can include any number of bonding recesses 166 or ridges 167. For example, FIG. 9 illustrates that the bonding protrusion 164 can include three bonding recesses 166 and three ridges 167. In alternative implementations, the bonding protrusion 164 can include one, two, three, or any number of bonding recesses 166 or ridges 167.

The strength of the bond between the melt-bondable panel mounting bracket 108 and a resin-based panel 102, and thus, the weight which the melt-bondable panel mounting bracket 108*a* may support, may be based at least in part upon the number and size of the bonding protrusion 164, bonding recesses 166, and/or ridges 167. Indeed, some implementations can include a greater number and/or a larger size of protrusions 164, recesses 166, or ridges 167, and thus, be configured for use with larger or heavier panels 102. On the other hand, some implementations can include a smaller number and/or size of bonding protrusions 164, recesses 166, or ridges 167, to allow a user to use the melt-bondable panel mounting bracket 108 with smaller gauged panels 102.

For example, the resin-based panel 102 can have a thickness or gauge between about one-eighth inch (⅛") and about five inches (5"), or thicker. The melt-bondable panel mounting bracket 108 can have a size and configuration depending upon the size and gauge of the resin-based panel 102. For example, the various bonding features (164, 166, 167, 168, 170) can have various configurations and sizes depending on the thickness of the resin-based panels 102 with which they are used.

In addition to the bonding protrusion(s) 164, the melt-bondable panel mounting bracket 108 can include additional bonding features that can aid in forming and strengthening a mechanical bond between the melt-bondable panel mounting bracket 108 and a resin-based panel 102. For example, FIG. 9 illustrates that the melt-bondable panel mounting bracket 108 can include a channel 170 extending into the body 160. The channel 170 can receive resin displaced by the bonding protrusions 164 as a user inserts the melt-bondable panel mounting bracket 108 in to a resin-based panel 102.

As mentioned previously, the melt-bondable panel mounting bracket 108 can secure a hardware component, such as for example, a twist-lock mounting system 100, to a resin-based panel 102. More specifically, the melt-bondable panel mounting bracket 108 can include a connection member configured for attachment to a hardware component. For example, FIG. 8 illustrates that the melt-bondable panel mounting bracket 108 can include a female receptacle 174 configured to receive a corresponding male member. In some implementations, the female receptacle 174 can include internal threads. As alluded to earlier, the female receptacle 174 can receive and secure a male connector 146 of a crown disk 114 of a twist-lock mounting system 100 (FIG. 2) therein.

Alternatively, the female receptacle 174 can receive and secure therein an end of correspondingly rod of another hardware component, such as for example, a standoff barrel. In additional implementations, the connection member of the melt-bondable panel mounting bracket 108 may not be a female receptacle. For example, the connection member can receive a portion of a cable or otherwise allow a user to suspend a resin-based panel 102 from a support structure. Thus, one will appreciate in light of the disclosure herein that the melt-bondable panel mounting bracket 108 can allow a user to secure a resin-based panel 102 to a support structure using a wide variety of different intermediate hardware options.

Figures 10, 11:
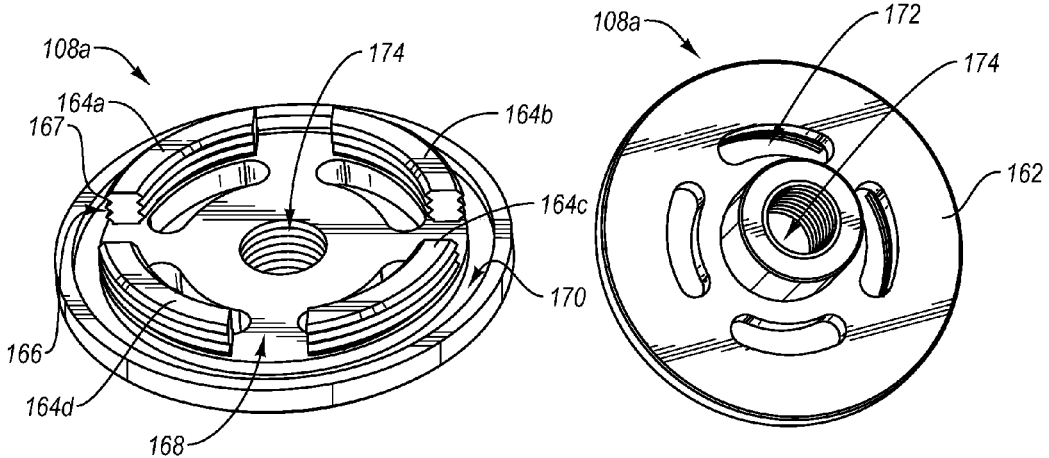
FIG. 10 illustrates an elevated, bottom perspective view of another melt-bondable panel mounting bracket in accordance with an implementation of the present invention.
FIG. 11 illustrates an elevated, top perspective view of the melt-bondable panel mounting bracket of FIG. 10.

FIGS. 10-13 illustrate another implementation of a melt-bondable panel mounting bracket 108a. Similar to the melt-bondable panel mounting bracket 108 described hereinabove, the melt-bondable panel mounting bracket 108a can include a connection member 174, a body 160, a bonding protrusion 164, bonding recesses 166, and ridges 167. Additionally, FIG. 10 illustrates that the melt-bondable panel mounting bracket 108a can also include one or more flow ways 168. The flow ways 168 can aid in forming a mechanical bond between the melt-bondable panel mounting bracket 108a and a resin-based panel 102.

For example, the flow ways 168 can help ensure that a portion of resin is not "stamped out" from the rest of the resin of the resin-based panel 102 when the melt-bondable panel mounting bracket 108a is secured directly into a resin-based panel 102. More specifically, the flow ways 168 can extend between and separate the bonding protrusion 164 into separate portions 164a-d, and thus, prevent the bonding protrusions 164 from isolating a portion of the resin of a resin-based panel 102. Furthermore, at least a portion of resin displayed by the one or more bonding protrusions 164 can flow through—or be displayed into—the one or more flow ways 168.

Additionally, in some implementations, the melt-bondable panel mounting bracket 108a can include one or more perforations. For example, FIGS. 10 and 11 illustrate that the melt-bondable panel mounting bracket 108a can include a perforation 172 at the base of each of the bonding protrusion 164. The perforations 172 can extend at least partially through the melt-bondable panel mounting bracket 108a. In some implementations, the perforations 172 can extend completely through the melt-bondable panel mounting bracket 108a. For example, FIGS. 10 and 11 illustrate that the perforations 172 can extend from the mounting surface 160 through the melt-bondable panel mounting bracket 108a to a top surface 162.

The perforations 172 can receive at least a portion of the heated resin displaced by the bonding protrusions 164 when a user inserts the melt-bondable panel mounting bracket 108a into a resin-based panel. In particular, the displaced resin can flow through the perforations 172 and onto the top surface 162 of melt-bondable panel mounting bracket 108a. Resin extending through the perforations 172 and onto the top surface 162 can help prevent the melt-bondable panel mounting bracket 108a from being pulled out of the resin-based panel 102 by sealing the melt-bondable panel mounting bracket 108a to the resin-based panel 102. Thus, the perforations 172 can help increase the strength of the bond between the melt-bondable panel mounting bracket 108a and a resin-based panel 102 by helping to essentially entangle various ridges and perforations of the melt-bondable bracket with eventually-solidified resin.

Figure 12:
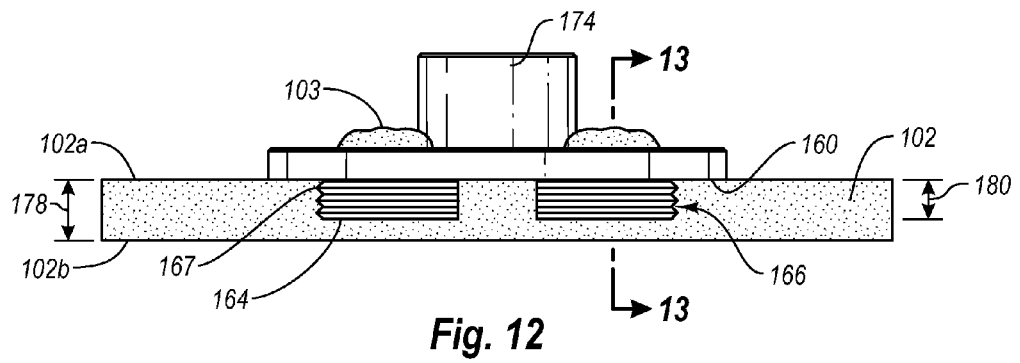
FIG. 12 illustrates a side view of the melt-bondable panel mounting bracket of FIG. 10 secured within a resin-based panel in accordance with an implementation of the present invention.

For example, FIG. 12 illustrates a side view of a melt-bondable panel mounting bracket 108a affixed into a resin-based panel 102. To affix the melt-bondable panel mounting bracket 108a to the resin-based panel 102, a user can place a heated melt-bondable panel mounting bracket 108a into a surface 102a of a resin-based panel 102. The heated melt-bondable panel mounting bracket 108a can heat the resin of the resin-based panel 102, thereby increasing the viscosity of the resin. The various features of the melt-bondable panel mounting bracket 108a can displace the resin as the user inserts the melt-bondable panel mounting bracket 108a into the resin-based panel 102. For example, the protrusion 164 can displace or otherwise cause resin 103 to flow through the perforations 172 onto the top surface 162. The displaced resin 103 on the top surface 162 of the melt-bondable panel mounting bracket 108a can help create and ensure a strong bond as previously mentioned.

Figure 13:
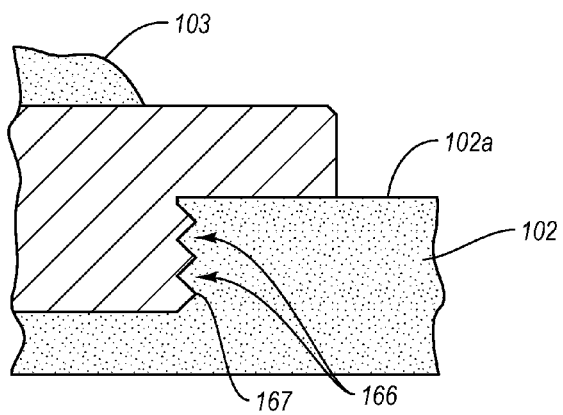
FIG. 13 illustrates an enlarged cross-sectional view of the melt-bondable panel mounting bracket and panel of FIG. 12 taken along the line 13-13 of FIG. 12.

Additionally, as FIG. 13 illustrates, resin can flow into the bonding recesses 166 and around or over the ridges 167. As mentioned previously, the bonding recesses 166 and ridges 167 can extend generally laterally into the bonding protrusions 164. FIG. 13 illustrates, in some implementations, the bonding recesses 166 and ridges 167 can extend in a direction substantially orthogonal to the direction in which a user inserts the melt-bondable panel mounting bracket 108a into the resin-based panel 102. Thus, resin in the bonding recesses 166 can reside longitudinally between the body 160 and a ridge 167, and thus, seal the ridges 167 within the resin of the resin-based panel 102.

Thus, the bonding features of the melt-bondable panel mounting bracket 108a can create a relatively strong bond with a resin-based panel 102. In particular, in some implementations, each melt-bondable panel mounting bracket 108a affixed directly into a resin-based panel 102 can hold between approximately 300 and approximately 700 pounds. Thus, a set of four melt-bondable panel mounting bracket 108a can hold or support approximately 2000 pounds. As such, a user can use implementations of melt-bondable panel mounting brackets 108a in a wide variety of design applications. For example, melt-bondable panel mounting bracket 108a of the present invention may be particularly suited for hanging panels from a ceiling or other support structure.

FIGS. 12 and 13 additionally illustrate that a user/assembler can select an appropriate size of melt-bondable panel mounting bracket 108a based at least on part of the thickness or gauge of the resin-based panel 102. For example, FIG. 12 illustrates that the resin-based panel 102 can have a gauge or thickness 178 extending between the bonding surface 102a and the display surface 102b. The user can select a melt-bondable panel mounting bracket 108a that will extend into, but not entirely through the thickness 178 of the resin-based panel 102. Thus, the bonding protrusions 164 can have a height 180 less than the thickness 178 of the resin-based panel 102. In this manner, when a user fully inserts the melt-bondable panel mounting bracket 108a into the resin-based panel 102, the bonding protrusions 166 can extend a distance into the resin-based panel 102 less than the thickness 178 of the resin-based panel 102.

Figure 14:
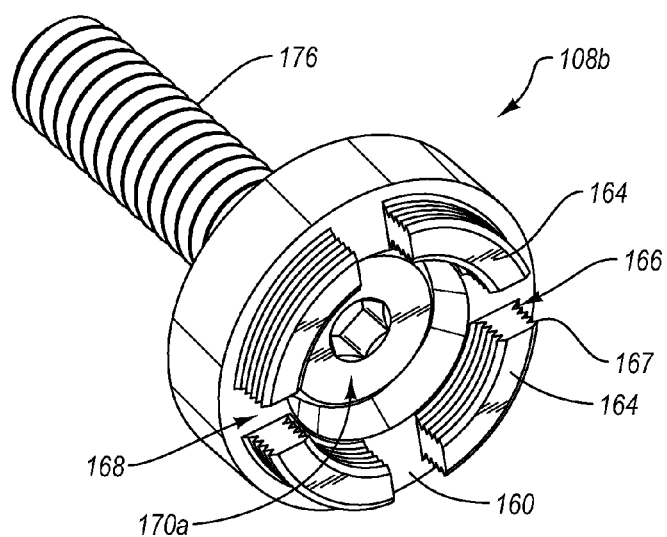
FIG. 14 illustrates a bottom perspective-view of a melt-bondable panel mounting bracket in accordance with an implementation of the present invention.

As the differences between the melt-bondable panel mounting brackets 108 and 108a illustrate, various implementations of the melt-bondable panel mounting bracket can include a variety of different configurations without departing from the scope and spirit of the present invention. For example, FIGS. 14-18 illustrate yet additional implementations of melt-bondable panel mounting brackets 108b, 108c, 108d, including yet further configurations and/or modifications. For example, although depicted as a threaded female receptacle 174 in FIGS. 8-13, the connection member of the melt-bondable panel mounting bracket is not so limited, and may comprise any number of different connectors. For example, FIG. 14 illustrates that the melt-bondable panel mounting bracket 108c can include a threaded rod 176 for a connection member. A user can secure the threaded rod 176 within a frame, an anchor, or other hardware component, which the user can in turn secure to a support structure.

As mentioned previously, the melt-bondable panel mounting bracket 108 can include a channel configured to receive displaced resin as a user inserts the melt-bondable panel mounting bracket 108 into a resin-based panel 102. In alternative implementations, however, the melt-bondable panel mounting bracket 108 may not include a channel. For example, FIG. 14 illustrates that instead of an annular channel 170 (FIG. 8), the channel 170 can comprise a generally circular channel 170a extending into the center of the melt-bondable panel mounting bracket 108b. Additionally, some implementations can include a channel 170a that extends not only partially, but completely through the melt-bondable panel mounting bracket 108b. Thus, in addition to receiving a portion of resin displaced by the bonding protrusion 164, the channel 170a can receive the connection member or other hardware. For example, FIG. 15 illustrates the channel 170a can receive a fastener having a threaded rod 176.

Similar to melt-bondable panel mounting brackets 108, 108a, FIG. 14 illustrates that melt-bondable panel mounting bracket 108b can include a bonding protrusion 164 extending generally away from a body 160. The bonding protrusion can include four annular portions separated by flow ways 168. The bonding protrusion 164 can include both bonding recesses 166 and ridges 167. In particular, FIG. 14 illustrates that the bonding protrusion 164 can include four bonding recesses 166 and four ridges 167.

Figure 15:
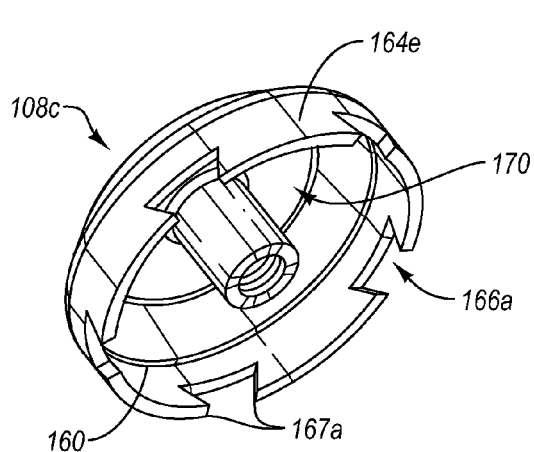
FIG. 15 illustrates a bottom perspective-view of a melt-bondable panel mounting bracket in accordance with another implementation of the present invention.
Figure 16:
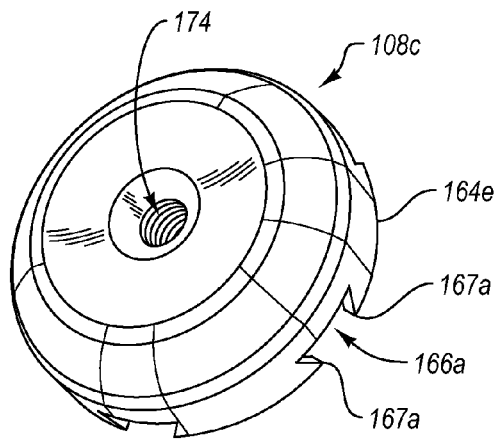
FIG. 16 illustrates a top perspective-view of the melt-bondable panel mounting bracket of FIG. 15.

FIGS. 15 and 16 illustrate yet an additional implementation of a melt-bondable panel mounting bracket 108c. As an initial matter, the melt-bondable panel mounting bracket 108c can comprise sheet metal. Thus, to form the melt-bondable panel mounting bracket 108c, a user can stamp a pattern out from a piece of sheet metal, and then bend or otherwise mold the stamp to form the melt-bondable panel mounting bracket 108c. A sheet metal configuration can allow for reduced manufacturing costs and time.

The melt-bondable panel mounting bracket 108c can include a connection member 174 configured to allow a user to connect the melt-bondable panel mounting bracket 108c to a twist-locking mounting assembly 100 or other hardware component. Additionally, the melt-bondable panel mounting bracket 108c can include a bonding protrusion and a plurality of bonding recesses 166a extending generally laterally into the bonding protrusion 164e. The bonding recesses 166a can help define ridges 167a, which extend in a generally lateral direction away from the bonding protrusion 164e.

More specifically, FIGS. 15 and 16 illustrate that the bonding recesses 166a can extend completely through the bonding protrusion 164e. The bonding recesses 166a can include any number of shapes and configurations. For example, FIGS. 15 and 16 illustrates that each bonding recess 166a can include a trapezoidal shape. Alternatively, each bonding recess 166a can include a square, oval, trapezoidal, or other cross-sectional shape.

Additionally, in some implementations the bonding recesses 166a can extend both laterally through—and longitudinally into—the bonding protrusion 164. For example, FIGS. 15 and 16 illustrate that the bonding recesses 166a can have a longitudinal opening separating opposing ridges 167a. One will appreciate in light of the disclosure herein that an open configuration can allow resin to flow longitudinally between ridges 167a and into the bonding recesses 166a. Thus, the open configuration of the bonding recesses 166a can allow a user to relatively quickly insert the melt-bondable panel mounting bracket 108c into the resin of a resin-based panel 102, and thus case the mounting bracket 108c to be essentially entangled with eventually-hardened panel matrix material (e.g., resin).

In alternative implementations, the bonding recesses 166a can include a closed configuration. For example, the ridges 167a can extend laterally across the bonding recesses 166a so that the bonding recesses 166a do not have a longitudinal opening. In a closed configuration, resin can flow longitudinally along the ridges 167a, and then laterally over the ridges 167a into the bonding recesses 166a. Thus, resin can wrap around the ridges 167a, thereby sealing and entangling the melt-bondable panel mounting bracket 108c into a resin-based panel 102.

Figure 17:
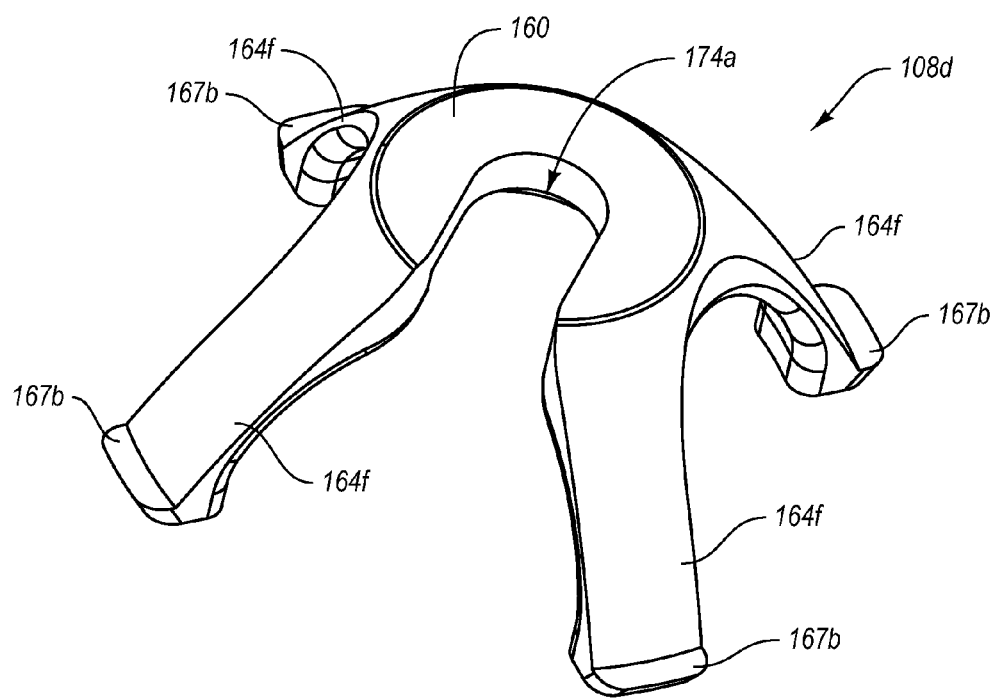
FIG. 17 illustrates a top perspective-view of a melt-bondable panel mounting bracket in accordance with another implementation of the present invention.
Figure 18:
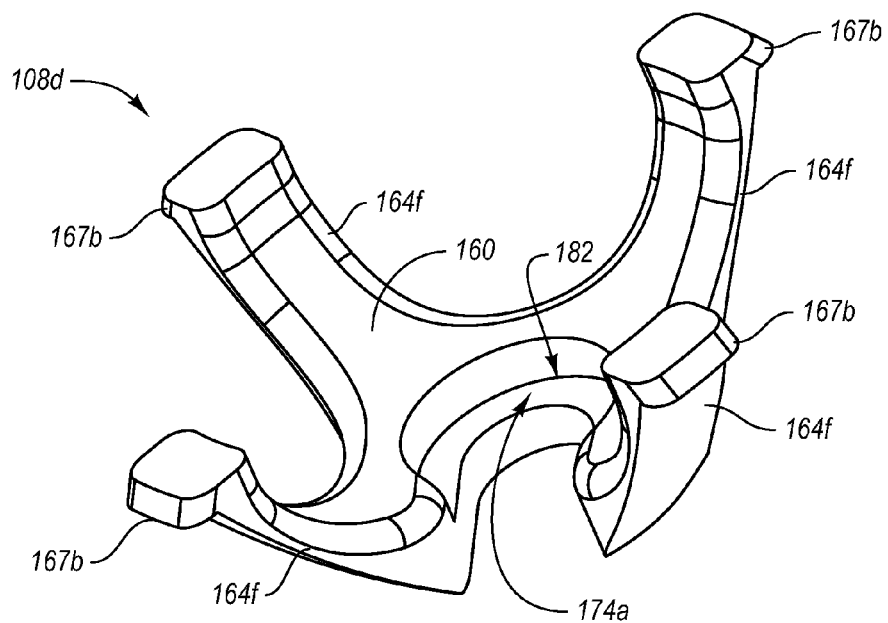
FIG. 18 illustrates a bottom perspective-view of the melt-bondable panel mounting bracket of FIG. 17.

FIGS. 17 and 18 illustrate an additional implementation of a melt-bondable panel mounting bracket 108d. As FIGS. 17 and 18 illustrate, the melt-bondable panel mounting bracket 108d can include a body 160 and four bonding protrusions 164f extending generally away from the body 160. Each of the bonding protrusions 164f can include a ridge 167b extending in a generally transverse direction from the bonding protrusions 164f. Thus, as explained above in relation to the other melt-bondable panel mounting brackets 108d, a user can heat and press the melt-bondable panel mounting bracket 108d into a resin-based panel 102. The heated melt-bondable panel mounting bracket 108d can cause the resin of the panel 102 to flow around and over the bonding protrusions 167b, thereby sealing and entangling the melt-bondable panel mounting bracket 108d into the resin-based panel 102.

One will appreciate that melt-bondable panel mounting bracket 108d may be particularly suitable for use with transparent or translucent panels 102. In particular, the increased height of the bonding protrusions 167f can ensure that the body 160 of the melt-bondable panel mounting bracket 108d is positioned farther from the panel to reduce its visibility through or behind the panel 102. Additionally, the ridges 167b can be configured so as to be strong enough to ensure an adequate bond, but at the same time small enough to not to distract from the aesthetics of a given panel 102.

The melt-bondable panel mounting bracket 108d can also include a connection member 174f configured to allow a user to secure the melt-bondable panel mounting bracket 108d, and thus a panel 102, to an additional hardware component. For example, FIGS. 17 and 18 illustrates that the connection member 174f can include a slot extending into the body 160 of the melt-bondable panel mounting bracket 108d between adjacent bonding protrusions 164f. One will appreciate that a user can slide the slot of the connection member 174f about a screw, anchor, cable, or other hardware component to secure the melt-bondable panel mounting bracket 108d to a support structure. Furthermore, FIG. 18 illustrates that the connection member 174f can include a recessed groove 182 within the body 160 of the melt-bondable panel mounting bracket 108d. The recessed grove 182 can receive a portion of an additional hardware component (e.g., the head of a fastener) and help secure the melt-bondable panel mounting bracket 108d to a support structure.

Implementations of the present invention also include methods of assembling and securing resin-based panels a support structure as a partition, display, treatment, barrier, or other structure. The following describes at least one implementation of a method of mounting resin-based panels 102 to a support structure 156 with reference to FIGS. 1-18. Of course, as a preliminary matter, one of ordinary skill in the art will recognize that the methods explained in detail can be modified in a wide variety of ways to install a wide variety of configurations using one or more components of the present invention. In particular, various acts of the method described below can be omitted or expanded, and the order of the various acts of the method described can be altered as desired. Thus, one should view the following acts or steps as an example of one implementation of a method in accordance with the present invention.

For example, in at least one method of the present invention, a user can secure at least one resin-based panel 102 to a support structure 156 using one or more of the components described herein. Specifically, the method can involve securing one of a locking pin 106 and a housing 104 to a support structure. For example, a user can secure a locking pin 106 to a support structure 156 using an anchor (not shown).

The method can additionally involve securing the other of the locking pin and the housing to a panel. For example, a user can secure the housing 104 to a resin-based panel 102 by inserting a male connector 146 of a crown disk 114 through a perforation in the resin-based panel 102. The user can then secure a standoff cap to the end of the male connector 104 until it rests against the display surface 102b of the resin-based panel 102a.

Alternatively, the method can involve heating a melt-bondable panel mounting bracket 108 to a temperature sufficient to at least partially melt the resin of a resin-based panel 102. Once the user has heated melt-bondable panel mounting bracket 108 to a sufficient temperature, the method can involve pressing the melt-bondable panel mounting bracket 108 into a bonding surface 102a of the resin-based panel 102. As a user presses melt-bondable panel mounting bracket 108 into a resin-based panel 102, the melt-bondable panel mounting bracket 108 can cause at least a portion of the resin of the resin-based panel 102 to at least partially melt. As the resin melts and softens it can begin to flow or be displaced into and around the various bonding features of the melt-bondable panel mounting bracket 108, as explained in greater detail above. Alternatively, pressing the melt-bondable panel mounting bracket 108 into a bonding surface 102a of the resin-based panel 102 can involve an automated machine, such as a computer numerical control machine (CNC machine), heating and pressing multiple melt-bondable panel mounting brackets 108 into a resin-based panel 102 simultaneously.

Once the user has permanently affixed the melt-bondable panel mounting bracket 108 within the resin-based panel 102, or even before if desired, the method can involve securing the housing 104 to the melt-bondable panel mounting bracket 108. For example, the user can thread the male connector 146 of a crown disk 114 into a female receptacle 174 of the melt-bondable panel mounting bracket 108. In alternative implementations, in which a twist-lock mounting assembly 100 is not used, the method can involve securing a standoff barrel to the melt-bondable panel mounting bracket 108.

The method can further involve securing the locking pin 106 to the housing 104. More specifically, the method can involve inserting the locking pin into the housing, thereby causing the locking pin to automatically rotate relative to the housing into a locked position, whereby the housing prevents the locking pin from being removed from the house. As described in greater detail above, as the user inserts the locking pin 106 into the housing 104, locking pin 106 can automatically rotate relative to the housing 104 into a locked position.

Additionally, in some implementations, the method of the present invention can involve dismounting a resin-based panel 102 from a support structure. For example, the method can involve moving the locking pin 106 toward the disk crown 114, thereby causing the locking pin 106 to engage a pair of helical protrusions 140. The pair of helical protrusions 140 can cause the locking pin 114 to rotate at least partially from the locked position toward the released position. The method can then involve retracting the locking pin 106 from the housing 104. As the user pulls the locking pin 106 from the housing 104, the housing 104 can cause the locking pin 106 to rotate into the released position, thereby allowing the locking pin 106 to exit the housing 104.

As the forgoing methods illustrate, systems and components of the present invention provide a great deal of versatility in mounting panels. In particular, the systems and components of the present invention enable panels to be secured to support structure using various components which allow for simple and fast assembly, protect the panel from damage, and provide a pleasing aesthetic.

The present invention may be embodied in other specific forms without departing from its spirit or essential characteristics. For example, the twist-lock mounting assemblies have been described herein above as including a locking pin having a flange that engages features in a housing that cause the locking pin to rotate in and out of locked and released position. In additional implementations, the housing can include one or more flanges that engage features on a locking pin that cause the housing to rotate about the locking pin in and out of locked and released positions.

The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:

1. A melt-bondable panel mounting bracket for mounting objects, including a decorative architectural resin-based panel, to a support structure in a manner that conceals mounting hardware from a facing view of the architectural resin-based panel, the bracket comprising:
   a body;
   one or more bonding protrusions integrated with the body, the one or more bonding protrusions extending in a first direction generally away from the body;
   one or more ridges extending generally transversely from the one or more bonding protrusions;
   one or more perforations through the body, the one or more perforations being located adjacent to the one or more protrusions in a manner that the one or more protrusions do not overlap the one or more perforations;
   a connection member configured to connect the melt-bondable panel mounting bracket to an additional hardware component; and one or more channels extending generally into a bonding surface of the body;
   wherein the one or more bonding protrusions are configured so that, upon application of heat and pressure, the bonding protrusions can be pressed into a resin-based panel and cause resin of the resin-based panel to melt and flow over the one or more ridges, thereby creating a mechanical bond between the panel and the melt-bondable panel mounting bracket; wherein the one or more channels are configured to receive molted resin displaced as the one or more bonding protrusions are heated and pressed into the resin-based panel.

2. The bracket as recited in claim 1, wherein:
the one or more perforations are configured to allow melted resin to flow therein as the one or more bonding protrusions are heated and pressed into the resin-based panel.

3. The bracket as recited in claim 1, wherein the one or more channels extend generally transversely into the one or more bonding protrusions.

4. The bracket as recited in claim 1, wherein the connection member comprises an internally threaded female receptacle configured to receive a correspondingly threaded rod.

5. The bracket as recited in claim 1, wherein the connection member includes a female receptacle that has internal threads.

6. The bracket as recited in claim 1, further comprising one or more flow ways located between the bonding protrusions.

7. The bracket as recited in claim 5, wherein the connection member extends in a second direction, generally away from the body.

8. The bracket as recited in claim 7, wherein the second direction is opposite to the first direction.

\* \* \* \* \*